United States Patent
Zhang et al.

(10) Patent No.: US 10,353,485 B1
(45) Date of Patent: Jul. 16, 2019

(54) MULTIFUNCTION INPUT DEVICE WITH AN EMBEDDED CAPACITIVE SENSING LAYER

(71) Applicant: Apple Inc., Cupertino, CA (US)

(72) Inventors: Chang Zhang, Cupertino, CA (US); Dayu Qu, Cupertino, CA (US); Golnaz Abdollahian, Cupertino, CA (US); Paul X. Wang, Cupertino, CA (US); Ray L. Chang, Sunnyvale, CA (US); John Buckmaster, Stanford, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/615,806

(22) Filed: Jun. 6, 2017

Related U.S. Application Data

(60) Provisional application No. 62/367,134, filed on Jul. 27, 2016.

(51) Int. Cl.
  *G06F 3/02* (2006.01)
  *G06F 3/044* (2006.01)

(52) U.S. Cl.
  CPC .............. *G06F 3/021* (2013.01); *G06F 3/044* (2013.01)

(58) Field of Classification Search
  None
  See application file for complete search history.

(56) References Cited

U.S. PATENT DOCUMENTS

| | | | |
|---|---|---|---|
| 3,657,492 A | 4/1972 | Arndt et al. | |
| 3,917,917 A | 11/1975 | Murata | |
| 3,978,297 A | 8/1976 | Lynn et al. | |
| 4,095,066 A | 6/1978 | Harris | |
| 4,319,099 A | 3/1982 | Asher | |
| 4,349,712 A | 9/1982 | Michalski | |
| 4,484,042 A | 11/1984 | Matsui | |
| 4,596,905 A | 6/1986 | Fowler | |
| 4,598,181 A | 7/1986 | Selby | |
| 4,670,084 A | 6/1987 | Durand et al. | |
| 4,755,645 A | 7/1988 | Naoki et al. | |
| 4,937,408 A | 6/1990 | Hattori et al. | |
| 4,987,275 A | 1/1991 | Miller et al. | |
| 5,021,638 A | 6/1991 | Nopper et al. | |
| 5,092,459 A | 3/1992 | Uljanic et al. | |
| 5,136,131 A | 8/1992 | Komaki | |
| 5,278,372 A | 1/1994 | Takagi et al. | |

(Continued)

FOREIGN PATENT DOCUMENTS

| | | |
|---|---|---|
| CN | 2155620 | 2/1994 |
| CN | 2394309 | 8/2000 |

(Continued)

OTHER PUBLICATIONS

Elekson, "Reliable and Tested Wearable Electronics Embedment Solutions," http://www.wearable.technology/our-technologies, 3 pages, at least as early as Jan. 6, 2016.

(Continued)

*Primary Examiner* — Duane N Taylor, Jr.
(74) *Attorney, Agent, or Firm* — Brownstein Hyatt Farber Schreck, LLP

(57) ABSTRACT

Disclosed herein is a multifunction input device, such as, a keyboard. The multifunction input device has a capacitive sensing layer that enables a user to use the multifunction input device as standard keyboard and also as a touch sensitive surface such as, for example, a trackpad.

14 Claims, 17 Drawing Sheets

(56) References Cited

U.S. PATENT DOCUMENTS

| | | |
|---|---|---|
| 5,280,146 A | 1/1994 | Inagaki et al. |
| 5,340,955 A | 8/1994 | Calvillo et al. |
| 5,382,762 A | 1/1995 | Mochizuki |
| 5,397,867 A | 3/1995 | Demeo |
| 5,408,060 A | 4/1995 | Muurinen |
| 5,421,659 A | 6/1995 | Liang |
| 5,422,447 A | 6/1995 | Spence |
| 5,457,297 A | 10/1995 | Chen |
| 5,477,430 A | 12/1995 | LaRose et al. |
| 5,481,074 A | 1/1996 | English |
| 5,504,283 A | 4/1996 | Kako et al. |
| 5,512,719 A | 4/1996 | Okada et al. |
| 5,625,532 A | 4/1997 | Sellers |
| 5,804,780 A | 9/1998 | Bartha |
| 5,828,015 A | 10/1998 | Coulon |
| 5,847,337 A | 12/1998 | Chen |
| 5,874,700 A | 2/1999 | Hochgesang |
| 5,875,013 A | 2/1999 | Takahara |
| 5,876,106 A | 3/1999 | Kordecki et al. |
| 5,878,872 A | 3/1999 | Tsai |
| 5,881,866 A | 3/1999 | Miyajima et al. |
| 5,898,147 A | 4/1999 | Domzaiski et al. |
| 5,924,555 A | 7/1999 | Sadamori et al. |
| 5,935,691 A | 8/1999 | Tsai |
| 5,960,942 A | 10/1999 | Thornton |
| 5,986,227 A | 11/1999 | Hon |
| 6,020,565 A | 2/2000 | Pan |
| 6,068,416 A | 5/2000 | Kumamoto et al. |
| 6,215,420 B1 | 4/2001 | Harrison et al. |
| 6,257,782 B1 | 7/2001 | Maruyama et al. |
| 6,259,046 B1 | 7/2001 | Iwama et al. |
| 6,377,685 B1 | 4/2002 | Krishnan |
| 6,388,219 B2 | 5/2002 | Hsu et al. |
| 6,423,918 B1 | 7/2002 | King et al. |
| 6,482,032 B1 | 11/2002 | Szu et al. |
| 6,530,283 B2 | 3/2003 | Okada et al. |
| 6,538,801 B2 | 3/2003 | Jacobson et al. |
| 6,542,355 B1 | 4/2003 | Huang |
| 6,552,287 B2 | 4/2003 | Janniere |
| 6,556,112 B1 | 4/2003 | Van Zeeland et al. |
| 6,559,399 B2 | 5/2003 | Hsu et al. |
| 6,560,612 B1 | 5/2003 | Yamada et al. |
| 6,572,289 B2 | 6/2003 | Lo et al. |
| 6,573,463 B2 | 6/2003 | Ono |
| 6,585,435 B2 | 7/2003 | Fang |
| 6,624,369 B2 | 9/2003 | Ito et al. |
| 6,706,986 B2 | 3/2004 | Hsu |
| 6,738,050 B2 | 5/2004 | Comiskey |
| 6,750,414 B2 | 6/2004 | Sullivan |
| 6,759,614 B2 | 7/2004 | Yoneyama |
| 6,762,381 B2 | 7/2004 | Kunthady et al. |
| 6,765,503 B1 | 7/2004 | Chan et al. |
| 6,788,450 B2 | 9/2004 | Kawai et al. |
| 6,797,906 B2 | 9/2004 | Ohashi |
| 6,850,227 B2 | 2/2005 | Takahashi et al. |
| 6,860,660 B2 | 3/2005 | Hochgesang et al. |
| 6,911,608 B2 | 6/2005 | Levy |
| 6,926,418 B2 | 8/2005 | Ostergård et al. |
| 6,940,030 B2 | 9/2005 | Takeda et al. |
| 6,977,352 B2 | 12/2005 | Oosawa |
| 6,979,792 B1 | 12/2005 | Lai |
| 6,987,466 B1 | 1/2006 | Welch et al. |
| 6,987,503 B2 | 1/2006 | Inoue |
| 7,012,206 B2 | 3/2006 | Oikawa |
| 7,030,330 B2 | 4/2006 | Suda |
| 7,038,832 B2 | 5/2006 | Kanbe |
| 7,126,499 B2 | 10/2006 | Lin et al. |
| 7,129,930 B1 | 10/2006 | Cathey et al. |
| 7,134,205 B2 | 11/2006 | Bruennel |
| 7,146,701 B2 | 12/2006 | Mahoney et al. |
| 7,151,236 B2 | 12/2006 | Ducruet et al. |
| 7,151,237 B2 | 12/2006 | Mahoney et al. |
| 7,154,059 B2 | 12/2006 | Chou |
| 7,161,084 B2 * | 1/2007 | Sandbach ............... G06F 3/023 174/117 M |
| 7,166,813 B2 | 1/2007 | Soma |
| 7,172,303 B2 | 2/2007 | Shipman et al. |
| 7,189,932 B2 | 3/2007 | Kim |
| 7,256,766 B2 | 8/2007 | Albert et al. |
| 7,283,119 B2 | 10/2007 | Kishi |
| 7,301,113 B2 | 11/2007 | Nishimura et al. |
| 7,312,790 B2 | 12/2007 | Sato et al. |
| 7,378,607 B2 | 5/2008 | Koyano et al. |
| 7,385,806 B2 | 6/2008 | Liao |
| 7,391,555 B2 | 6/2008 | Albert et al. |
| 7,414,213 B2 | 8/2008 | Hwang |
| 7,429,707 B2 | 9/2008 | Yanai et al. |
| 7,432,460 B2 | 10/2008 | Clegg |
| 7,510,342 B2 | 3/2009 | Lane et al. |
| 7,531,764 B1 | 5/2009 | Lev et al. |
| 7,541,554 B2 | 6/2009 | Hou |
| 7,589,292 B2 | 9/2009 | Jung et al. |
| 7,639,187 B2 | 12/2009 | Caballero et al. |
| 7,639,571 B2 | 12/2009 | Ishii et al. |
| 7,651,231 B2 | 1/2010 | Chou et al. |
| 7,679,010 B2 | 3/2010 | Wingett |
| 7,724,415 B2 | 5/2010 | Yamaguchi |
| 7,781,690 B2 | 8/2010 | Ishii |
| 7,813,774 B2 | 10/2010 | Perez-Noguera |
| 7,842,895 B2 | 11/2010 | Lee |
| 7,847,204 B2 | 12/2010 | Tsai |
| 7,851,819 B2 | 12/2010 | Shi |
| 7,866,866 B2 | 1/2011 | Wahlstrom |
| 7,893,376 B2 | 2/2011 | Chen |
| 7,923,653 B2 | 4/2011 | Ohsumi |
| 7,947,915 B2 | 5/2011 | Lee et al. |
| 7,999,748 B2 | 8/2011 | Ligtenberg et al. |
| 8,063,325 B2 | 11/2011 | Sung et al. |
| 8,077,096 B2 | 12/2011 | Chiang et al. |
| 8,080,744 B2 | 12/2011 | Yeh et al. |
| 8,098,228 B2 | 1/2012 | Shimodaira et al. |
| 8,109,650 B2 | 2/2012 | Chang et al. |
| 8,119,945 B2 | 2/2012 | Lin |
| 8,124,903 B2 | 2/2012 | Tatehata et al. |
| 8,134,094 B2 | 3/2012 | Tsao et al. |
| 8,143,982 B1 | 3/2012 | Lauder et al. |
| 8,156,172 B2 | 4/2012 | Muehl et al. |
| 8,178,808 B2 | 5/2012 | Strittmatter et al. |
| 8,184,021 B2 | 5/2012 | Chou |
| 8,212,160 B2 | 7/2012 | Tsao |
| 8,212,162 B2 | 7/2012 | Zhou |
| 8,218,301 B2 | 7/2012 | Lee |
| 8,232,958 B2 | 7/2012 | Tolbert |
| 8,246,228 B2 | 8/2012 | Ko et al. |
| 8,253,048 B2 | 8/2012 | Ozias et al. |
| 8,253,052 B2 | 9/2012 | Chen |
| 8,263,887 B2 | 9/2012 | Chen et al. |
| 8,289,280 B2 | 10/2012 | Travis |
| 8,299,382 B2 | 10/2012 | Takemae et al. |
| 8,317,384 B2 | 11/2012 | Chung et al. |
| 8,319,298 B2 | 11/2012 | Hsu |
| 8,325,141 B2 | 12/2012 | Marsden |
| 8,330,725 B2 | 12/2012 | Mahowald et al. |
| 8,354,629 B2 | 1/2013 | Lin |
| 8,378,857 B2 | 2/2013 | Pance |
| 8,383,972 B2 | 2/2013 | Liu |
| 8,384,566 B2 | 2/2013 | Bocirnea |
| 8,404,990 B2 | 3/2013 | Lutgring et al. |
| 8,451,146 B2 | 3/2013 | Mahowald et al. |
| 8,431,849 B2 | 4/2013 | Chen |
| 8,436,265 B2 | 5/2013 | Koike et al. |
| 8,462,514 B2 | 6/2013 | Myers et al. |
| 8,500,348 B2 | 8/2013 | Dumont et al. |
| 8,502,094 B2 | 8/2013 | Chen |
| 8,542,194 B2 | 9/2013 | Akens et al. |
| 8,548,528 B2 | 10/2013 | Kim et al. |
| 8,564,544 B2 | 10/2013 | Jobs et al. |
| 8,569,639 B2 | 10/2013 | Strittmatter |
| 8,575,632 B2 | 11/2013 | Kuramoto et al. |
| 8,581,127 B2 | 11/2013 | Jhuang et al. |
| 8,592,699 B2 | 11/2013 | Kessler et al. |
| 8,592,702 B2 | 11/2013 | Tsai |
| 8,592,703 B2 | 11/2013 | Johnson et al. |
| 8,604,370 B2 | 12/2013 | Chao |

(56) References Cited

U.S. PATENT DOCUMENTS

| | | |
|---|---|---|
| 8,629,362 B1 | 1/2014 | Knighton et al. |
| 8,642,904 B2 | 2/2014 | Chiba et al. |
| 8,651,720 B2 | 2/2014 | Sherman et al. |
| 8,659,882 B2 | 2/2014 | Liang et al. |
| 8,731,618 B2 | 5/2014 | Jarvis et al. |
| 8,748,767 B2 | 6/2014 | Ozias et al. |
| 8,759,705 B2 | 6/2014 | Funakoshi et al. |
| 8,760,405 B2 | 6/2014 | Nam |
| 8,786,548 B2 | 7/2014 | Oh et al. |
| 8,791,378 B2 | 7/2014 | Lan |
| 8,835,784 B2 | 9/2014 | Hirota |
| 8,847,090 B2 | 9/2014 | Ozaki |
| 8,847,711 B2 | 9/2014 | Yang et al. |
| 8,853,580 B2 | 10/2014 | Chen |
| 8,854,312 B2 | 10/2014 | Meierling |
| 8,870,477 B2 | 10/2014 | Merminod et al. |
| 8,884,174 B2 | 11/2014 | Chou et al. |
| 8,921,473 B1 | 12/2014 | Hyman |
| 8,922,476 B2 | 12/2014 | Stewart et al. |
| 8,943,427 B2 | 1/2015 | Heo et al. |
| 8,976,117 B2 | 3/2015 | Krahenbuhl et al. |
| 8,994,641 B2 | 3/2015 | Stewart et al. |
| 9,007,297 B2 | 4/2015 | Stewart et al. |
| 9,012,795 B2 | 4/2015 | Niu et al. |
| 9,024,214 B2 | 5/2015 | Niu et al. |
| 9,029,723 B2 | 5/2015 | Pegg |
| 9,063,627 B2 | 6/2015 | Yairi et al. |
| 9,064,642 B2 | 6/2015 | Welch et al. |
| 9,086,733 B2 | 7/2015 | Pance |
| 9,087,663 B2 | 7/2015 | Los |
| 9,093,229 B2 | 7/2015 | Leong et al. |
| 9,213,416 B2 | 12/2015 | Chen |
| 9,223,352 B2 | 12/2015 | Smith et al. |
| 9,234,486 B2 | 1/2016 | Das et al. |
| 9,235,236 B2 | 1/2016 | Nam |
| 9,274,654 B2 | 3/2016 | Slobodin et al. |
| 9,275,810 B2 | 3/2016 | Pance et al. |
| 9,300,033 B2 | 3/2016 | Han et al. |
| 9,305,496 B2 | 4/2016 | Kimura |
| 9,348,425 B2 | 5/2016 | Chi et al. |
| 9,405,369 B2 | 8/2016 | Modarres et al. |
| 9,412,533 B2 | 8/2016 | Hendren et al. |
| 9,443,672 B2 | 9/2016 | Martisauskas |
| 9,448,628 B2 | 9/2016 | Tan et al. |
| 9,448,631 B2 | 9/2016 | Winter et al. |
| 9,449,772 B2 | 9/2016 | Leong et al. |
| 9,471,185 B2 | 10/2016 | Guard |
| 9,477,382 B2 | 10/2016 | Hicks et al. |
| 9,502,193 B2 | 11/2016 | Niu et al. |
| 9,612,674 B2 | 4/2017 | Degner et al. |
| 9,640,347 B2 | 5/2017 | Kwan et al. |
| 9,704,665 B2 | 7/2017 | Brock et al. |
| 9,704,670 B2 | 7/2017 | Leong et al. |
| 9,710,069 B2 | 7/2017 | Leong et al. |
| 9,715,978 B2 | 7/2017 | Hendren |
| 9,734,965 B2 | 8/2017 | Martinez et al. |
| 9,761,389 B2 | 9/2017 | Leong et al. |
| 9,793,066 B1 | 10/2017 | Brock et al. |
| 9,910,211 B2 | 3/2018 | Kloeppel et al. |
| 10,001,812 B2 | 6/2018 | Andre et al. |
| 10,082,880 B1 | 9/2018 | Yarak, III et al. |
| 2002/0079211 A1 | 6/2002 | Katayama et al. |
| 2002/0093436 A1 | 7/2002 | Lien |
| 2002/0113770 A1 | 8/2002 | Jacobson et al. |
| 2002/0149835 A1 | 10/2002 | Kanbe |
| 2003/0169232 A1 | 9/2003 | Ito |
| 2004/0004559 A1 | 1/2004 | Rast |
| 2004/0225965 A1 | 11/2004 | Garside et al. |
| 2005/0035950 A1 | 2/2005 | Daniels |
| 2005/0253801 A1 | 11/2005 | Kobayashi |
| 2006/0011458 A1 | 1/2006 | Purcocks |
| 2006/0020469 A1 | 1/2006 | Rast |
| 2006/0120790 A1 | 6/2006 | Chang |
| 2006/0181511 A1 | 8/2006 | Woolley |
| 2006/0243987 A1 | 11/2006 | Lai |
| 2007/0200823 A1 | 8/2007 | Bytheway et al. |
| 2007/0285393 A1 | 12/2007 | Ishakov |
| 2008/0131184 A1 | 6/2008 | Brown et al. |
| 2008/0136782 A1 | 6/2008 | Mundt et al. |
| 2008/0251370 A1 | 10/2008 | Aoki |
| 2009/0046053 A1 | 2/2009 | Shigehiro et al. |
| 2009/0103964 A1 | 4/2009 | Takagi et al. |
| 2009/0128496 A1 | 5/2009 | Huang |
| 2009/0262085 A1 | 10/2009 | Wassingbo et al. |
| 2009/0267892 A1 | 10/2009 | Faubert |
| 2010/0045705 A1 | 2/2010 | Vertegaal et al. |
| 2010/0066568 A1 | 3/2010 | Lee |
| 2010/0109921 A1 | 5/2010 | Annerfors |
| 2010/0156796 A1 | 6/2010 | Kim et al. |
| 2010/0253630 A1 | 10/2010 | Homma et al. |
| 2011/0032127 A1 | 2/2011 | Roush |
| 2011/0056817 A1 | 3/2011 | Wu |
| 2011/0056836 A1 | 3/2011 | Tatebe et al. |
| 2011/0205179 A1 | 8/2011 | Braun |
| 2011/0261031 A1 | 10/2011 | Muto |
| 2011/0267272 A1 | 11/2011 | Meyer et al. |
| 2011/0284355 A1 | 11/2011 | Yang |
| 2012/0012446 A1 | 1/2012 | Hwa |
| 2012/0032972 A1 | 2/2012 | Hwang |
| 2012/0090973 A1 | 4/2012 | Liu |
| 2012/0098751 A1 | 4/2012 | Liu |
| 2012/0286701 A1 | 11/2012 | Yang et al. |
| 2012/0298496 A1 | 11/2012 | Zhang |
| 2012/0313856 A1 | 12/2012 | Hsieh |
| 2013/0043115 A1 | 2/2013 | Yang et al. |
| 2013/0093500 A1 | 4/2013 | Bruwer |
| 2013/0093733 A1 | 4/2013 | Yoshida |
| 2013/0100030 A1 | 4/2013 | Los et al. |
| 2013/0120265 A1 | 5/2013 | Horii et al. |
| 2013/0161170 A1 | 6/2013 | Fan et al. |
| 2013/0215079 A1 | 8/2013 | Johnson et al. |
| 2013/0270090 A1 | 10/2013 | Lee |
| 2014/0015777 A1 | 1/2014 | Park et al. |
| 2014/0027259 A1 | 1/2014 | Kawana et al. |
| 2014/0071654 A1* | 3/2014 | Chien .................. H01H 13/704 362/23.03 |
| 2014/0082490 A1 | 3/2014 | Jung et al. |
| 2014/0090967 A1 | 4/2014 | Inagaki |
| 2014/0098042 A1 | 4/2014 | Kuo et al. |
| 2014/0151211 A1 | 6/2014 | Zhang |
| 2014/0184496 A1 | 7/2014 | Gribetz et al. |
| 2014/0191973 A1 | 7/2014 | Zellers et al. |
| 2014/0218851 A1 | 8/2014 | Klein et al. |
| 2014/0252881 A1 | 9/2014 | Dinh et al. |
| 2014/0291133 A1 | 10/2014 | Fu et al. |
| 2014/0375141 A1 | 12/2014 | Nakajima |
| 2015/0016038 A1 | 1/2015 | Niu et al. |
| 2015/0083561 A1 | 3/2015 | Han et al. |
| 2015/0270073 A1 | 9/2015 | Yarak, III et al. |
| 2015/0277559 A1 | 10/2015 | Vescovi et al. |
| 2015/0287553 A1 | 10/2015 | Welch et al. |
| 2015/0309538 A1 | 10/2015 | Zhang |
| 2015/0370339 A1 | 12/2015 | Ligtenberg et al. |
| 2015/0378391 A1 | 12/2015 | Huitema et al. |
| 2016/0049266 A1 | 2/2016 | Stringer et al. |
| 2016/0093452 A1 | 3/2016 | Zercoe et al. |
| 2016/0172129 A1 | 6/2016 | Zercoe et al. |
| 2016/0189890 A1 | 6/2016 | Leong et al. |
| 2016/0189891 A1 | 6/2016 | Zercoe et al. |
| 2016/0329166 A1 | 11/2016 | Hou et al. |
| 2016/0336124 A1 | 11/2016 | Leong et al. |
| 2016/0336127 A1 | 11/2016 | Leong et al. |
| 2016/0336128 A1 | 11/2016 | Leong et al. |
| 2016/0343523 A1 | 11/2016 | Hendren et al. |
| 2016/0351360 A1 | 12/2016 | Knopf et al. |
| 2016/0365204 A1 | 12/2016 | Cao et al. |
| 2016/0378234 A1 | 12/2016 | Ligtenberg et al. |
| 2016/0379775 A1 | 12/2016 | Leong et al. |
| 2017/0004939 A1 | 1/2017 | Kwan et al. |
| 2017/0011869 A1 | 1/2017 | Knopf et al. |
| 2017/0090104 A1 | 3/2017 | Cao et al. |
| 2017/0090106 A1 | 3/2017 | Cao et al. |
| 2017/0301487 A1 | 10/2017 | Leong et al. |
| 2017/0315624 A1 | 11/2017 | Leong et al. |

(56) References Cited

U.S. PATENT DOCUMENTS

| | | | |
|---|---|---|---|
| 2017/0315628 A1* | 11/2017 | Yao | ............... G06F 3/0416 |
| 2018/0029339 A1 | 2/2018 | Liu et al. | |
| 2018/0040441 A1 | 2/2018 | Wu et al. | |
| 2018/0074694 A1 | 3/2018 | Lehmann et al. | |
| 2019/0033923 A1 | 1/2019 | Wang et al. | |

FOREIGN PATENT DOCUMENTS

| | | |
|---|---|---|
| CN | 1533128 | 9/2004 |
| CN | 1542497 | 11/2004 |
| CN | 2672832 | 1/2005 |
| CN | 1624842 | 6/2005 |
| CN | 1812030 | 8/2006 |
| CN | 1838036 | 9/2006 |
| CN | 1855332 | 11/2006 |
| CN | 101051569 | 10/2007 |
| CN | 200961844 | 10/2007 |
| CN | 200986871 | 12/2007 |
| CN | 101146137 | 3/2008 |
| CN | 201054315 | 4/2008 |
| CN | 201084602 | 7/2008 |
| CN | 201123174 | 9/2008 |
| CN | 201149829 | 11/2008 |
| CN | 101315841 | 12/2008 |
| CN | 201210457 | 3/2009 |
| CN | 101438228 | 5/2009 |
| CN | 101465226 | 6/2009 |
| CN | 101494130 | 7/2009 |
| CN | 101502082 | 8/2009 |
| CN | 201298481 | 8/2009 |
| CN | 101546667 | 9/2009 |
| CN | 101572195 | 11/2009 |
| CN | 101800281 | 8/2010 |
| CN | 101807482 | 8/2010 |
| CN | 101868773 | 10/2010 |
| CN | 201655616 | 11/2010 |
| CN | 102110542 | 6/2011 |
| CN | 102119430 | 7/2011 |
| CN | 201904256 | 7/2011 |
| CN | 102163084 | 8/2011 |
| CN | 201927524 | 8/2011 |
| CN | 201945951 | 8/2011 |
| CN | 201945952 | 8/2011 |
| CN | 201956238 | 8/2011 |
| CN | 102197452 | 9/2011 |
| CN | 202008941 | 10/2011 |
| CN | 202040690 | 11/2011 |
| CN | 102280292 | 12/2011 |
| CN | 102338348 | 2/2012 |
| CN | 102375550 | 3/2012 |
| CN | 202205161 | 4/2012 |
| CN | 102496509 | 6/2012 |
| CN | 10269527 | 8/2012 |
| CN | 102622089 | 8/2012 |
| CN | 102629526 | 8/2012 |
| CN | 202372927 | 8/2012 |
| CN | 102679239 | 9/2012 |
| CN | 102683072 | 9/2012 |
| CN | 202434387 | 9/2012 |
| CN | 202523007 | 11/2012 |
| CN | 102832068 | 12/2012 |
| CN | 102955573 | 3/2013 |
| CN | 102956386 | 3/2013 |
| CN | 102969183 | 3/2013 |
| CN | 103000417 | 3/2013 |
| CN | 103165327 | 6/2013 |
| CN | 103180979 | 6/2013 |
| CN | 203012648 | 6/2013 |
| CN | 203135988 | 8/2013 |
| CN | 103377841 | 10/2013 |
| CN | 103489986 | 1/2014 |
| CN | 203414880 | 1/2014 |
| CN | 103681056 | 3/2014 |
| CN | 103699181 | 4/2014 |
| CN | 203520312 | 4/2014 |
| CN | 203588895 | 5/2014 |
| CN | 103839715 | 6/2014 |
| CN | 103839720 | 6/2014 |
| CN | 103839722 | 6/2014 |
| CN | 203630729 | 6/2014 |
| CN | 103903891 | 7/2014 |
| CN | 103956290 | 7/2014 |
| CN | 203733685 | 7/2014 |
| CN | 104021968 | 9/2014 |
| CN | 204102769 | 1/2015 |
| CN | 204117915 | 1/2015 |
| CN | 104517769 | 4/2015 |
| CN | 204632641 | 9/2015 |
| CN | 105097341 | 11/2015 |
| DE | 2530176 | 1/1977 |
| DE | 3002772 | 7/1981 |
| DE | 29704100 | 4/1997 |
| DE | 202008001970 | 8/2008 |
| EP | 0441993 | 8/1991 |
| EP | 1835272 | 9/2007 |
| EP | 1928008 | 6/2008 |
| EP | 2202606 | 6/2010 |
| EP | 2426688 | 3/2012 |
| EP | 2439760 | 4/2012 |
| EP | 2463798 | 6/2012 |
| EP | 2664979 | 11/2013 |
| FR | 2147420 | 3/1973 |
| FR | 2911000 | 7/2008 |
| FR | 2950193 | 3/2011 |
| GB | 1361459 | 7/1974 |
| JP | S50115562 | 9/1975 |
| JP | S60055477 | 3/1985 |
| JP | S61172422 | 10/1986 |
| JP | S62072429 | 4/1987 |
| JP | S63182024 | 11/1988 |
| JP | H0422024 | 4/1992 |
| JP | H0520963 | 1/1993 |
| JP | H0524512 | 8/1993 |
| JP | H05342944 | 12/1993 |
| JP | H09204148 | 8/1997 |
| JP | H10312726 | 11/1998 |
| JP | H11194882 | 7/1999 |
| JP | 2000010709 | 1/2000 |
| JP | 2000057871 | 2/2000 |
| JP | 2000339097 | 12/2000 |
| JP | 2001100889 | 4/2001 |
| JP | 2003114751 | 9/2001 |
| JP | 2002260478 | 9/2002 |
| JP | 2002298689 | 10/2002 |
| JP | 2003522998 | 7/2003 |
| JP | 2005108041 | 4/2005 |
| JP | 2006164929 | 6/2006 |
| JP | 2006185906 | 7/2006 |
| JP | 2006521664 | 9/2006 |
| JP | 2006269439 | 10/2006 |
| JP | 2006277013 | 10/2006 |
| JP | 2006344609 | 12/2006 |
| JP | 2007115633 | 5/2007 |
| JP | 2007514247 | 5/2007 |
| JP | 2007156983 | 6/2007 |
| JP | 2008021428 | 1/2008 |
| JP | 2008041431 | 2/2008 |
| JP | 2008100129 | 5/2008 |
| JP | 2008191850 | 8/2008 |
| JP | 2008533559 | 8/2008 |
| JP | 2008293922 | 12/2008 |
| JP | 2009099503 | 5/2009 |
| JP | 2009181894 | 8/2009 |
| JP | 2010061956 | 3/2010 |
| JP | 2010244088 | 10/2010 |
| JP | 2010244302 | 10/2010 |
| JP | 2011018484 | 1/2011 |
| JP | 2011065126 | 3/2011 |
| JP | 2011150804 | 8/2011 |
| JP | 2011165630 | 8/2011 |
| JP | 2011524066 | 8/2011 |
| JP | 2011187297 | 9/2011 |
| JP | 2012022473 | 2/2012 |
| JP | 2012043705 | 3/2012 |

(56) References Cited

FOREIGN PATENT DOCUMENTS

| | | |
|---|---|---|
| JP | 2012063630 | 3/2012 |
| JP | 2012098873 | 5/2012 |
| JP | 2012134064 | 7/2012 |
| JP | 2012186067 | 9/2012 |
| JP | 2012230256 | 11/2012 |
| JP | 2014017179 | 1/2014 |
| JP | 2014216190 | 11/2014 |
| JP | 2014220039 | 11/2014 |
| JP | 2016053778 | 4/2016 |
| KR | 1019990007394 | 1/1999 |
| KR | 1020020001668 | 1/2002 |
| KR | 100454203 | 10/2004 |
| KR | 1020060083032 | 7/2006 |
| KR | 1020080064116 | 7/2008 |
| KR | 1020080066164 | 7/2008 |
| KR | 2020110006385 | 6/2011 |
| KR | 1020120062797 | 6/2012 |
| KR | 1020130040131 | 4/2013 |
| KR | 20150024201 | 3/2015 |
| TV | 201108286 | 3/2011 |
| TW | 200703396 | 1/2007 |
| TW | M334397 | 6/2008 |
| TW | 201108284 | 3/2011 |
| TW | M407429 | 7/2011 |
| TW | 201246251 | 11/2012 |
| TW | 201403646 | 1/2014 |
| WO | WO9744946 | 11/1997 |
| WO | WO2005/057320 | 6/2005 |
| WO | WO2006/022313 | 3/2006 |
| WO | WO2007/049253 | 5/2007 |
| WO | WO2008/045833 | 4/2008 |
| WO | WO2009/005026 | 1/2009 |
| WO | WO2012/011282 | 1/2012 |
| WO | WO2012/027978 | 3/2012 |
| WO | WO2013/096478 | 6/2013 |
| WO | WO2014175446 | 10/2014 |

OTHER PUBLICATIONS

U.S. Appl. No. 14/472,260, filed Aug. 28, 2014, pending.
U.S. Appl. No. 14/501,680, filed Sep. 30, 2014, pending.
U.S. Appl. No. 15/230,724, filed Aug. 8, 2016, pending.
U.S. Appl. No. 15/342,715, filed Nov. 3, 2016, pending.
U.S. Appl. No. 15/459,009, filed Mar. 15, 2017, pending.
U.S. Appl. No. 15/649,840, filed Jul. 14, 2017, pending.
U.S. Appl. No. 15/687,297, filed Aug. 25, 2017, pending.
U.S. Appl. No. 15/692,810, filed Aug. 31, 2017, pending.
U.S. Appl. No. 15/725,125, filed Oct. 4, 2017, pending.

\* cited by examiner

MULTIFUNCTION INPUT DEVICE WITH AN EMBEDDED CAPACITIVE SENSING LAYER

CROSS-REFERENCE TO RELATED APPLICATION(S)

This application is a nonprovisional patent application of and claims the benefit under 35 U.S.C. 119(e) of U.S. Provisional Patent Application No. 62/367,134, filed Jul. 27, 2016 and titled "Multifunction Input Device with an Embedded Capacitive Sensing Layer," the disclosure of which is hereby incorporated herein by reference in its entirety

FIELD

The described embodiments relate generally to an input device, for example, a keyboard for a computing device. More specifically, the embodiments described herein are directed to a keyboard that enables a user to provide mechanical input and touch input to a computing device associated with the keyboard.

BACKGROUND

Some portable computing devices, such as laptop computers, include a standard QWERTY keyboard for providing text input. These portable computing devices may also include a trackpad, a mouse and/or a touch sensitive display that enables the user to provide touch input to the computing device.

Although a variety of input devices may be provided, a user is typically required to move his hands from one input device to another in order to provide each type of input. For example, if a user is typing on the keyboard and wishes to select a particular icon on the display or move a cursor, the user is required to move his hands from the keyboard to a mouse, a trackpad or the display. Once the user has completed the desired action with the touch input device and wishes to return to typing, the user again places his hands on the keyboard.

SUMMARY

Described herein is a multifunction input device that utilizes both mechanical input and touch input when providing input to a computing device. In some embodiments, the multifunction input device is a keyboard. The keyboard may include a keycap, a frame at least partially surrounding the keycap, and a capacitive sensing layer. The capacitive sensing layer defines a void space in which an electrical contact is positioned. The capacitive sensing layer also includes one or more sense electrodes and at least one drive electrode arranged around a periphery of the void space.

The present disclosure also describes a stackup for an input device. The stackup includes an input surface at least partially surrounded by a frame, a substrate, an electrical contact positioned underneath the input surface, and a capacitive sensing layer associated with the substrate. The capacitive sensing layer includes first and second sense electrodes electrically coupled to one another and a drive electrode positioned between the first and second sense electrodes. In some embodiments, a portion of at least one of the first sense electrode or the second sense electrode extends beneath the input surface but does not overlap the electrical contact.

Also described is a method for determining a type of input received on a touch-sensitive keyboard. This method includes detecting a first change in capacitance in response to received input at a first location on the touch-sensitive keyboard and detecting a second change in capacitance in response to input received at a second location on the touch-sensitive keyboard. The first location is different from the second location. The method continues by normalizing the first change in capacitance with respect to the second change in capacitance.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
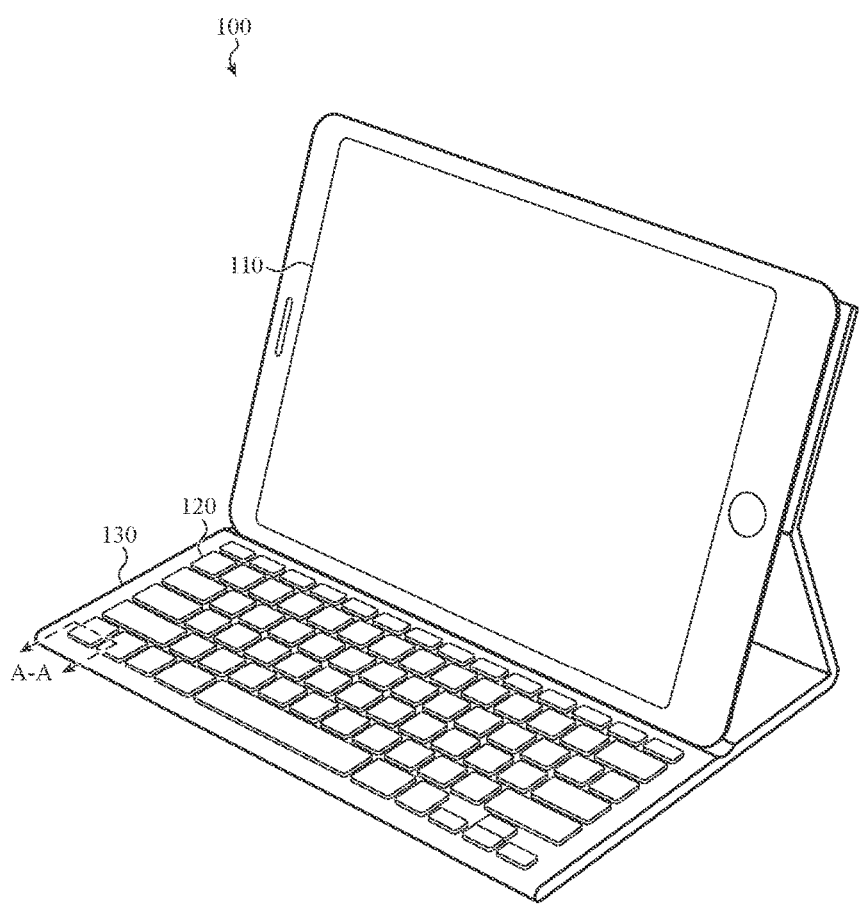
FIG. 1A illustrates an example computing device that may use or otherwise incorporate a multifunction input device.

Reference will now be made in detail to representative embodiments illustrated in the accompanying drawings. It should be understood that the following descriptions are not intended to limit the embodiments to one preferred configuration. To the contrary, it is intended to cover alternatives, modifications, and equivalents as can be included within the spirit and scope of the described embodiments as defined by the appended claims.

The embodiments described herein are directed to a multifunction input device that utilizes both mechanical input and touch input when providing input to a computing device. In some embodiments, the multifunction input device is a keyboard. The keyboard may be integrated with the computing device or it may be removably coupled to the computing device.

For example, the computing device may be a laptop computer having an integrated keyboard. In another example, the computing device may be a tablet computer and the multifunction input device may be a keyboard that can be attached to and detached from the tablet computer. The multifunction input device may be any other electronic device, and can couple to any input device having multiple keys, buttons, or the like.

The multifunction input device may utilize or otherwise enable a user to provide mechanical input and touch input to the computing device. For example, the multifunction input device may have a number of keys or buttons that may be actuated by a user. In addition, the multifunction input device may enable a user to provide touch input to the keys or buttons in order to move a cursor, select a displayed icon, perform a gesture, and so on. The multifunction input device can also provide inputs across multiple keys, using multiple key surfaces for single input.

The multifunction input device may have a capacitive sensing layer disposed underneath each of the buttons or keys. As such, the entire surface of the input device (or designated portions of the surface of the input device) may function as a trackpad or other touch-sensitive input device. Thus, when a user wishes to move a cursor, select an icon or perform an action associated with a gesture, the user can provide the input directly on the surface of the keys or buttons of the input device, without removing his fingers or hands from the surface of the input device or pressing the keys/buttons.

As briefly discussed above, the multifunction input device includes a capacitive sensing layer positioned underneath the buttons or keys. The capacitive sensing layer includes various drive and sense electrodes arranged in a particular pattern.

In one embodiment, the capacitive sensing layer includes at least two sense electrodes electrically coupled to one another (e.g., in pairs). One or more drive electrodes are positioned between the pairs of sense electrodes. The sense electrodes and the drive electrodes may have various dimensions and be arranged in various ways and patterns.

For example, the sense electrodes may be arranged in rows while the drive electrodes are arranged in columns. In another arrangement, the sense electrodes may be arranged in columns while the drive electrodes are arranged in rows. In yet another embodiment, portions of the drive electrodes may be interdigitated or otherwise interleaved with portions of the sense electrodes to form an interdigitated pattern. In another example, the sense electrodes may be arranged in a first plane and the drive electrodes may be arranged on a second, different plane. In some embodiments, the dimensions of the drive and sense electrodes may vary. For example, the dimensions of the drive electrodes and/or the sense electrodes may have a first set of dimensions at a first area on the substrate and may have a second set of dimensions at a second area on the substrate.

As the multifunction input device described herein has dual functionality, it may be calibrated so that a detected change in capacitance is normalized or equalized across the entire surface of the multifunction input device including any void spaces or dead spots associated with the key. For example, the multifunction input device may consist of a number of keys or buttons that are each surrounded by a frame. The capacitive sensing layer is provided underneath the frame and the keys. When an input mechanism, such as a user's finger, travels over the keys and the frame of the multifunction input device, the input mechanism causes a change in capacitance that is detectable by the capacitive sensing layer.

However, the ability to detect a change in capacitance may vary at different locations on the multifunction input device. For example, components of the key (e.g., keycap, dome, switch etc.) may disrupt, interfere with or otherwise weaken a capacitive coupling between a user's finger or other input device and the capacitive sensing layer. In another example, a void space may be formed in the capacitive sensing layer. However, the frame of the input device does not include those structures. Accordingly, a greater change in capacitance may occur and/or be detected when the input mechanism passes over the frame. Accordingly, some of the embodiments described herein are directed to calibrating the multifunction input device in order to normalize or equalize the change in capacitance that is detected over the surface of the multifunction input device including the void space on the capacitive sensing layer.

In some embodiments, the multifunction input device may include a fabric layer positioned over each of the keys and the frame. The fabric layer may provide a smooth sensation to the user and also soften rough edges of an input surface of a keycap that a user contacts as he moves his hands or fingers across the surface of each of the keys when providing touch input. The fabric layer may include embossed portions that correspond to each key of the input device. The embossed portions may be adhered to each keycap. However, the embossed portions may also extend beyond the surface of the keycap in order to provide a smooth transition between the frame and each key.

The use of the term "embossed" does not imply or require any particular method for forming a corresponding feature or area. Rather, an embossed area, feature, or the like may be formed by any suitable process or mechanism, including heat forming, molding, stamping, crimping, weaving, or the like. Some embossed areas or structures discussed herein have one or more sidewalls connecting the raised region to the lower region; such sidewalls may be generally perpendicular to one of or both the raised and lower regions, although this is not necessary.

These and other embodiments are discussed below with reference to FIGS. 1-10. However, those skilled in the art will readily appreciate that the detailed description given herein with respect to these Figures is for explanatory purposes only and should not be construed as limiting.

FIG. 1 illustrates an example computing device 100 that may use or otherwise incorporate the multifunction input device of the present disclosure. In some embodiments, the multifunction input device is a keyboard and the computing device 100 is a tablet computer. The keyboard may be removably attached from the computing device 100 or it may be integrated with the computing device 100. For example, although a tablet computer is shown, the computing device may be a laptop computer, a mobile phone, a personal digital assistant, or other portable computing device. Further, although a keyboard is specifically mentioned, the embodiments described herein may be incorporated by various input devices or mechanisms such as, for example, trackpads, mice, buttons, and so on.

The computing device 100 may include a display 110. The display 110 may function as both an input device and an output device. For example, the display 110 may output images, graphics, text, and the like to a user. The display 110 may also act as a touch input device that detects and measures a location of touch input on the display 110. The computing device 100 may also include one or more force sensors that detect and/or measure an amount of force exerted on the display 110.

The keyboard of the computing device 100 includes one or more keys or buttons, such as key 120. Each of the one or more keys may correspond to a particular input. The keyboard may also include a frame 130, a key web or other support structure. The frame 130 may define apertures though which the one or more keys are placed. The frame 130 may be made of various materials such as, but not limited to, aluminum, plastic, metal, rubber and the like and may be used to provide structural support for the keyboard and/or the one or more keys. The frame 130 may also separate adjacent keys from one another and/or from a housing of the computing device 100. The keyboard may also include a fabric layer that is placed over each of the one or more keys and/or the frame 130.

In some embodiments, the computing device 100 may also include an input component (not shown). The input component may be a touch input device such as a trackpad. In some implementations, the input component may be omitted from the computing device 100 as the keyboard may function as a touch input device and a keyboard.

Figure 1B:
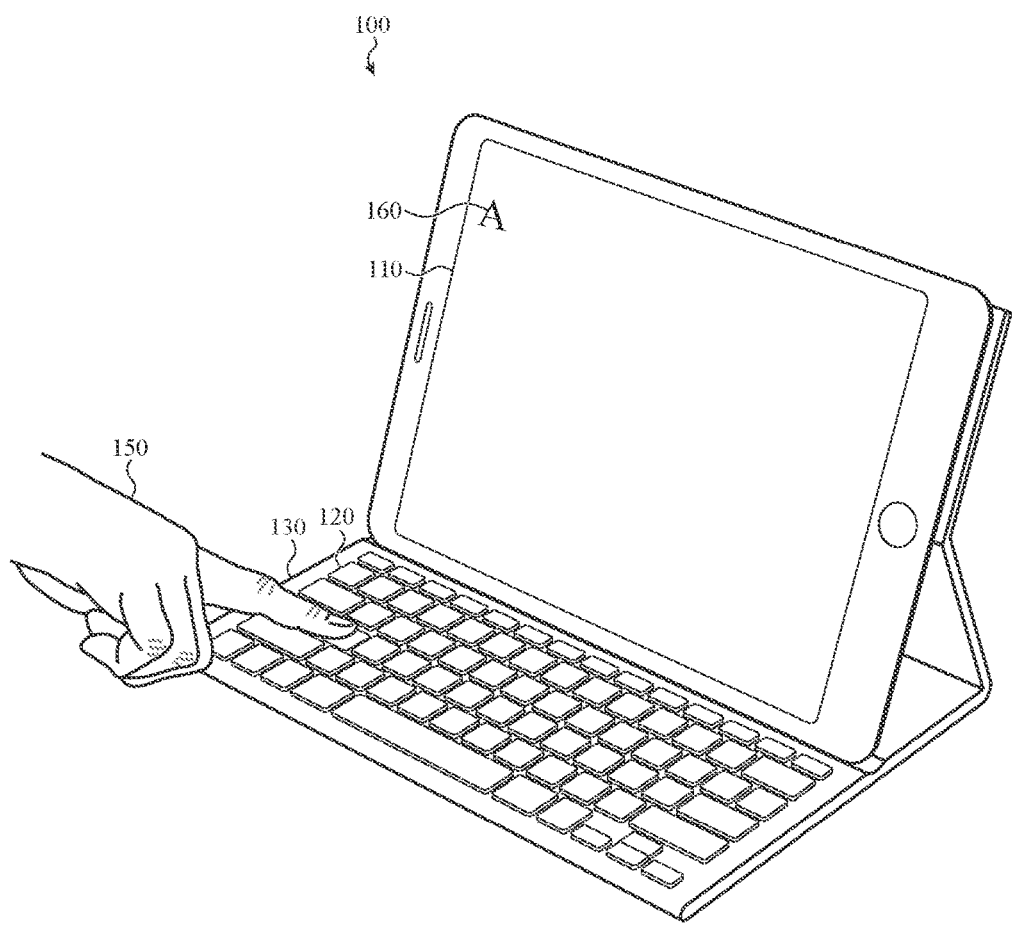
FIG. 1B illustrates the example computing device of FIG. 1A in which a user is providing a first type of input to the multifunction input device.

For example, and as shown in FIG. 1B, an input mechanism 150, such as a user's finger, may actuate one of the keys to cause the computing device 100 to produce an output 160 on the display 110. In some embodiments, the keys, such as key 120, may be a mechanical key having a switch, a contact, or other such mechanism that provides a signal when the key 120 is actuated. In other embodiments, actuation of the keys may be detected by one or more capacitive sensors or the capacitive sensing layer described herein. In other embodiments, the capacitive sensing layer described herein may be configured to detect an amount of force provided on each key. For example, as one or more components of the capacitive sensing layer are moved closer together, the change in capacitance between the layers may be detected. The amount of force provided on the key may then be determined.

In addition, the keys, such as key 120, may act as multi-touch input devices. The multi-touch input device can detect a change in capacitance in more than one area. When a touch is determined, the computing device 100 performs a certain action. For example, and turning to FIG. 1C, the user may move an input mechanism 150, such as his finger, across one or more keys of a keyboard and one or more portions of the frame 130 in the direction of arrow 170. In response, a cursor 180, or other icon shown on the display 110, may move in the direction of arrow 190. In some embodiments, the keys are not actuated (although they may be actuated) as the user moves his finger across the surface of each key 120 and across or over the surface of the frame 130.

Rather, the capacitive sensing layer detects the change in capacitance at a given area and provides the detected change to a processing unit of the computing device 100. The processing unit then determines the appropriate action to take based on the detected change in capacitance. For example, the processing unit may determine that the change in capacitance over various keys indicates a scroll operation. In another embodiment, the detected change in capacitance may indicate a gesture, a swipe or other types of input. Although the keys may function as a multi-touch input device, an input component, such as a trackpad, may also have multi-touch input functionality or it may be omitted.

In some embodiments, the capacitive sensing layer may detect the placement of a user's hands and/or fingers on the keyboard. If placement is incorrect (e.g., the fingers are not properly placed on the home row of the keyboard or in another default position) the computing device may notify the user of the incorrect placement. In some embodiments, the notification may be a haptic output that is provided by a haptic actuator associated with computing device 100 or can be a notification or alert that is shown on the display 110.

Figure 2A:
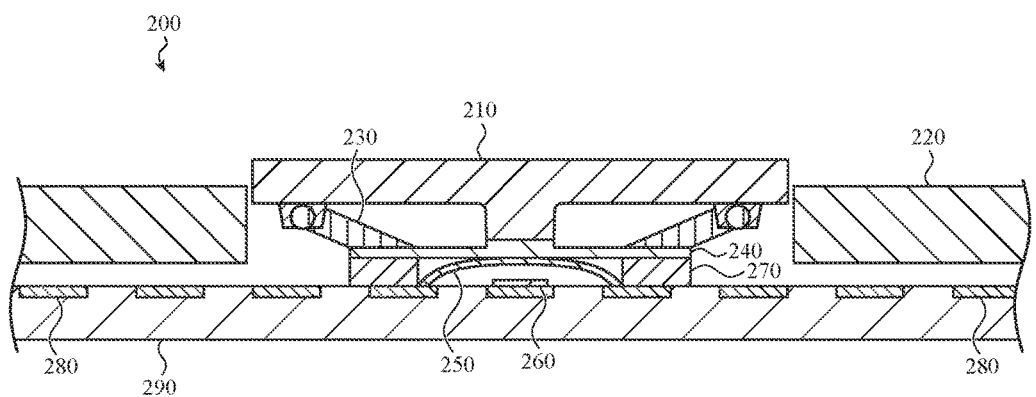
FIG. 2A illustrates a sample cross-section view of a stackup of a key of the multifunction input device taken from line A-A of FIG. 1A according to a first embodiment.

FIG. 2A illustrates a cross-section view of a stackup of a key 200 of a multifunction input device, taken along line A-A of FIG. 1A, according to a first embodiment. The stackup of the key 200 includes a keycap 210 or other input surface that is at least partially surrounded by a frame 220, a key web or other support structure. In some instances, the frame 220 defines an aperture though which the keycap 210 is placed.

As will be described in detail below, the key 200 may include or otherwise be associated with a capacitive sensing layer 280 that detects a change in capacitance when a user's finger contacts and/or presses the key 200. The change in capacitance may indicate a location of the touch on the key 200 and/or the amount of force provided on the key 200.

The keycap 210 may be coupled to a restoring mechanism 230 that enables the keycap 210 to move from a first position to a second position within the frame 220 when actuated. The restoring mechanism 230 may be a scissor mechanism, a butterfly mechanism, a hinge mechanism and the like that restores the keycap 210 to its nominal position when the keycap 210 is released or no longer actuated. Although specific restoring mechanisms 230 are disclosed, the capacitive sensing layer 280 may be used or otherwise integrated with any key architecture.

The key 200 may also include a membrane 240 positioned over a dome mechanism 250 and a contact 260. In some embodiments, the membrane 240 is coupled to a contact housing 270 that contains the dome mechanism 250 and the contact 260. In operation, the membrane 240 acts as a seal to prevent contaminants from interfering with the electrical and/or mechanical operation of the dome mechanism 250 and/or the contact 260. In some embodiments, the membrane 240 may be made of rubber, plastic or other such materials.

The contact housing 270 may secure or otherwise anchor the dome mechanism 250 during actuation of the keycap 210. For example, when the keycap 210 is actuated, the dome mechanism 250 is deformed or is otherwise compressed so that it touches or otherwise connects to the contact 260 thereby indicating the key 200 has been actuated. In some embodiments, the dome mechanism 250 may be a metal dome, a rubber dome, a plastic dome or it may be made from various other materials.

The key 200 also includes a capacitive sensing layer 280. The capacitive sensing layer 280 may be integrated or embedded with a printed circuit board 290 or other substrate. As will be described below, the capacitive sensing layer 280 may be comprised of various sense electrodes and drive electrodes arranged in a particular pattern. The sense electrodes and drive electrodes are configured to detect a change in capacitance in a given region or area of the multifunction input device and/or over a particular key 200 when an input mechanism, such as a user's finger, contacts the keycap 210 and the frame 220 as it moves over the surface.

However, the presence of the various components of the key 200 (e.g., the membrane 240, the dome mechanism 250, the keycap 210 and so on) may disrupt or otherwise interfere with the capacitive readings of the capacitive sensing layer 280.

For example, the surface of the keyboard may include discontinuities due to the profile of the keycap 210 and/or the difference in height between the keycap 210 and the frame 220. As such, an input mechanism, such as a user's finger, may be a first distance away from the capacitive sensing layer 280 at a first location (e.g., over the keycap 210) and may be a second distance away from the capacitive sensing layer 280 at a second location (e.g., over the frame 220). In such instances, a touch profile detected by the capacitive sensing layer 280 may be distorted based on the location of the contact. Accordingly, and as will be described below, the detected change in capacitance may be normalized in order to remedy such affects.

Figure 2B:
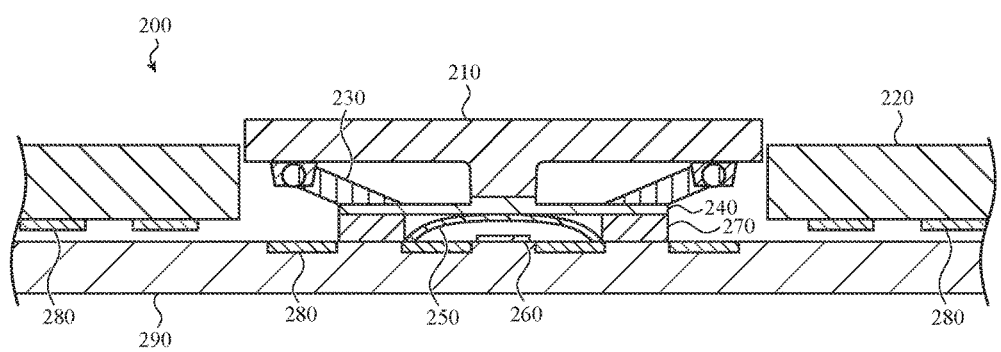
FIG. 2B illustrates a sample cross-section view of a stackup of a key of the multifunction input device taken from line A-A of FIG. 1A according to a second embodiment.

FIG. 2B illustrates a cross-section view of the stackup of the key 200 of the multifunction input device taken along line A-A of FIG. 1A according to a second embodiment. In this implementation, the key 200 includes similar components to those described above. For example, the key 200 includes a keycap 210 disposed within an aperture defined by a frame 220. The key 200 also includes a restoring mechanism 230, an optional membrane 240, a dome mechanism 250, a contact 260 and a contact housing 270. Each of these components function in a similar manner as described above.

The key 200 also includes a capacitive sensing layer 280 and a printed circuit board 290 or other substrate. However, in this embodiment, the capacitive sensing layer 280 may be coupled to both the frame 220 and the printed circuit board 290. For example, a first portion of the capacitive sensing layer 280 may be provided on a bottom surface of the frame 220 and a second portion (e.g., the portion positioned under the keycap 210) may be provided on the printed circuit board 290. In some embodiments, the frame 220 may include a surface that extends underneath the keycap 210. In another embodiment, a portion of the capacitive sensing layer 280 may be provided on a top surface of the frame 220 or may otherwise be integrated within the frame 220 while the second portion of the capacitive sensing layer 280 (or a different capacitive sensing layer 280) is provided under the keycap 210.

In still yet other embodiments, the second portion of the capacitive sensing layer 280 may be omitted. In such embodiments, the portions of the capacitive sensing layer 280 that are near or otherwise border the keycap 210 may detect a change in capacitance (although the detected change in capacitance may be weaker due to the lack of the capacitive sensing layer 280 directly underneath the keycap 210) when a user's finger is near or is otherwise touching the keycap 210.

Figure 3A:
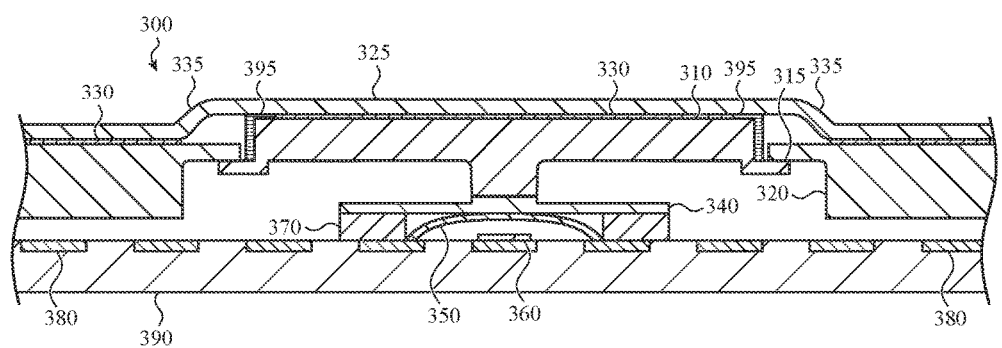
FIG. 3A illustrates a sample cross-section view of a stackup of a key of the multifunction input device taken from line A-A of FIG. 1A according to a third embodiment.

FIG. 3A illustrates a cross-section view of a stackup of a key 300 of the multifunction input device taken along line A-A of FIG. 1A, according to a third embodiment. The key 300 includes a keycap 310 or other input surface positioned within an aperture defined by the frame 320. In this embodiment, the keycap 310 may include a flange 315 that interacts with or otherwise contacts a portion of the frame 320 when the key 300 is in its nominal position. In this particular embodiment, the key 300 includes a fabric layer 325 that is positioned over the keycap 310. The fabric layer 325 may be bonded or otherwise coupled to the keycap by an adhesive 330.

In some embodiments, the portion of the fabric layer 325 that is coupled to the keycap 310 includes a raised or an embossed portion. The embossed portion may have surface area that is larger than a surface area of the keycap 310. The embossed portion may be defined by or otherwise include a transition ramp 335 that extends beyond an outer edge of the keycap 310.

The transition ramp 335 provides a smooth transition between each key 300 of the keyboard. For example, in typical keyboards, a space is present between each key. As a user slides his finger over the keys, the user's finger contacts rigid edges of each key. Continuous contact of these rigid edges may cause discomfort to the user's finger. However, the transition ramp 335 provides a transition point between the portion of the keyboard with the frame 320 and the edge of the keycap 310 which reduces or eliminates the rigid transitions that may otherwise be present between keys of the keyboard. In some embodiments, a bumper 395 may also be provided on the edge of the keycap 310. The bumper 395 may be made of rubber, plastic or other soft or pliable material that may reduce the rigidity of the sidewall of the keycap 310.

In some embodiments, the fabric layer 325 may be coupled to the frame 320 using an adhesive 330. In other implementations, the adhesive 330 on the frame 320 may be omitted. In the latter implementation, the fabric layer 325 may cover the frame 320 or may be adhered to the frame 320 at select areas (e.g., around a perimeter of the frame 320).

In some instances, the fabric layer 325 may act as a restoring mechanism that returns the keycap 310 to its nominal position once the key 300 has been actuated. As such, a restoring mechanism, for example, a scissor mechanism or a butterfly mechanism may be omitted. In other embodiments the key 300 may include a scissor or butterfly mechanism such as shown above with respect to FIGS. 2A-2B.

The key 300 may also include membrane 340, a dome mechanism 350 and a contact 360. The membrane 340 may be coupled to a contact housing 370. Each of these components may function in a similar manner to the similar components descried above. The key 300 may also include a capacitive sensing layer 380 associated with or otherwise embedded within or on a printed circuit board 390 or other substrate. As described above, the capacitive sensing layer 380 may detect a change in capacitance as a user moves his finger over the surface of the keycap 310, the frame 320 and the fabric layer 325.

Figure 3B:
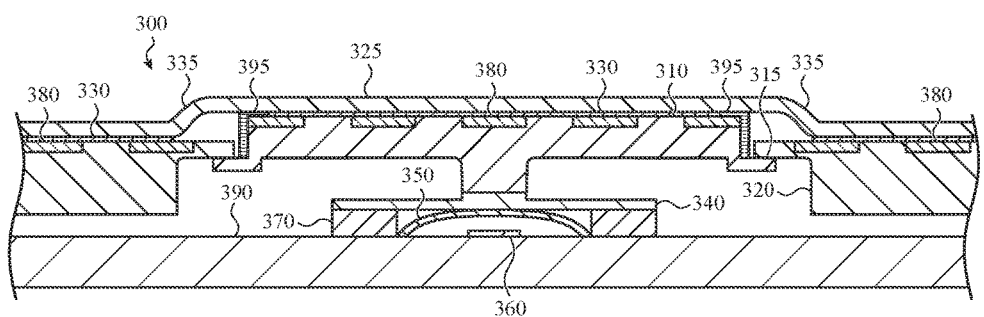
FIG. 3B illustrates a sample cross-section view of a stackup of a key of the multifunction input device taken from line A-A of FIG. 1A according to a fourth embodiment.

FIG. 3B illustrates a cross-section view of a stackup of a key 300 of the multifunction input device taken along line A-A of FIG. 1A according to a fourth embodiment. In this implementation, the key 300 includes similar components to those described above with respect to FIG. 3A. For example, the key 300 includes a keycap 310 or other input surface disposed within an aperture defined by the frame 320. The keycap 310 may include a flange 315 that interacts or otherwise contacts the frame 320 such as described above. A fabric layer 325 may be adhered to the keycap 310 using an adhesive 330. The fabric layer 325 may extend to the frame 320 and include a transition ramp 335. The key 300 also includes a membrane 340, a dome mechanism 350, a contact 360, a contact housing 370 and bumper 395. Each of these components function in a similar manner as described above.

The key 300 also includes a capacitive sensing layer 380 and a printed circuit board 390. However, in this embodiment, the capacitive sensing layer 380 is provided underneath the fabric layer 325. In some embodiments, the capacitive sensing layer 380 may be coupled to the frame 320 or otherwise integrated with the frame 320. The capacitive sensing layer 380 may also be provided in the keycap 310. In yet another embodiment the capacitive sensing layer 380 may be coupled to an underside of the fabric layer 325.

Although specific examples have been given, the capacitive sensing layer 380 may be disposed on multiple surfaces within the stackup. For example, a first capacitive sensing layer 380 may be positioned on a first part of the key stackup (e.g., the printed circuit board 390) while a second capacitive sensing layer 380 is positioned on a different part of the key stackup.

Figure 1C:
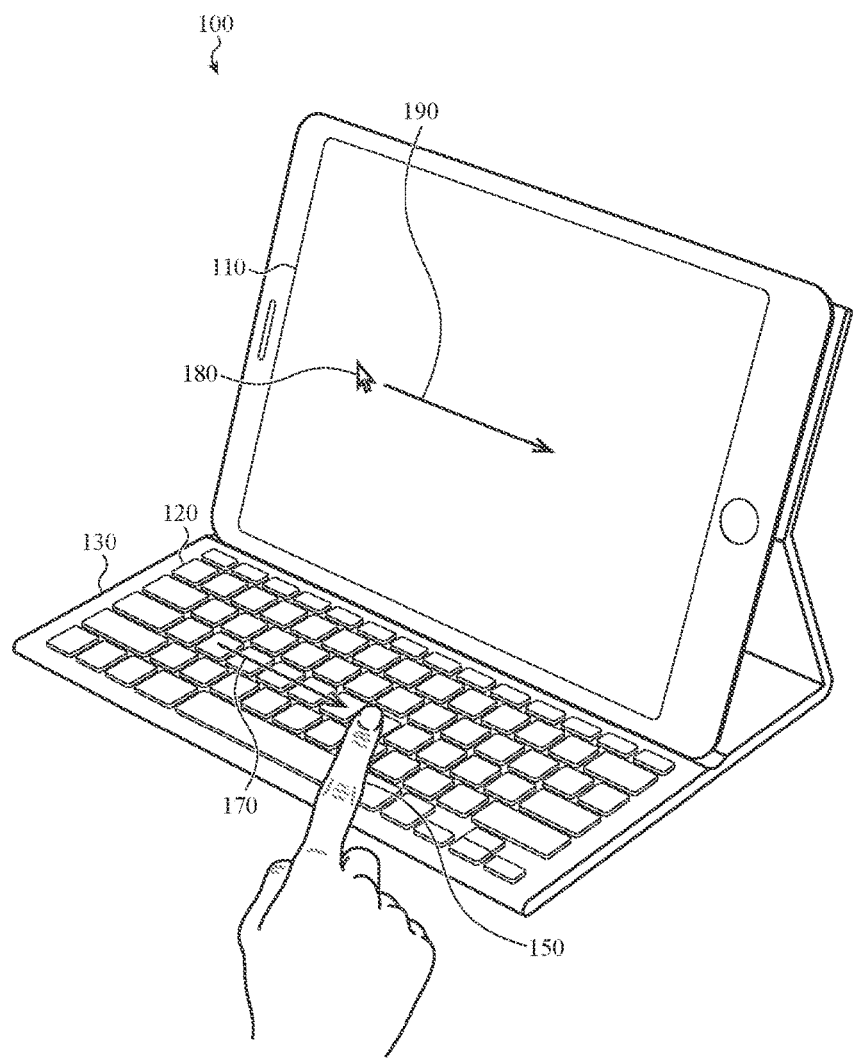
FIG. 1C illustrates the example computing device of FIG. 1A in which a user is providing a second type of input to the multifunction input device.
Figure 4:
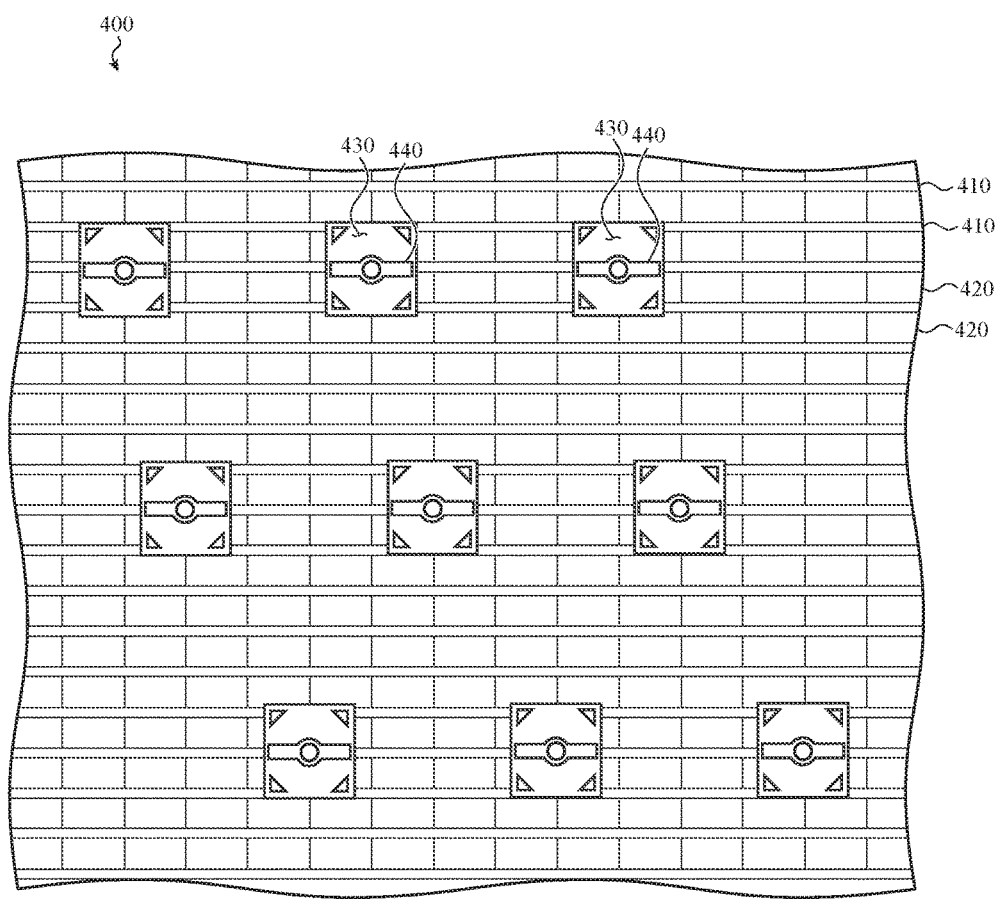
FIG. 4 illustrates an example substrate having a capacitive sensing layer.

FIG. 4 illustrates an example substrate 400 having a capacitive sensing layer that may be used or incorporated by a multifunction input device, for example, the keyboard shown in FIGS. 1A-1C. The capacitive sensing layer may be associated or otherwise embedded with the substrate 400. In other embodiments, the substrate 400 may be comprised of different layers. In such implementations, the capacitive sensing layer may make up at least one of the layers and be deposited on the substrate 400.

The capacitive sensing layer includes at least two sense electrodes 410 and one or more drive electrodes 420. In some embodiments, the sense electrodes 410 are electrically couple in pairs and at least one drive electrode 420 may be positioned between each of the sense electrodes 410. In this particular arrangement, the sense electrodes 410 are arranged in rows and the drive electrodes 420 are arranged in columns. However, in other implementations, the drive electrodes 420 may be arranged in rows while the sense electrodes 410 are arranged in columns.

In some embodiments, the drive electrodes 420 and the sense electrodes 410 are in the same layer or plane of the substrate 400. In another embodiment, the drive electrodes 420 are on a first layer or plane and the sense electrodes 410 are on a second layer or plane. The drive electrodes 420 and the sense electrodes 410 may be coupled together by various trace lines that travel through the different layers.

The substrate 400 may also include one or more void spaces 430 that contain or otherwise include one or more electrical contacts 440. The electrical contacts 440 may be metal contacts that are used for a key make or other electrical connection between the keys of the keyboard and the substrate 400. For example, when a key is actuated, a structure associated with the key may contact the electrical contact 440 to provide an electrical make which indicates to a processor of the computing device that a particular key has been actuated.

However, the capacitive sensing layer, and more specifically, the drive electrodes 420 and the sense electrodes 410, may not extend into the void spaces 430. For example, the drive electrodes 420 and the sense electrodes 410 surround a periphery of the void space 430. As used herein, a void space 430 or a dead spot means an area on the substrate 400 in which a signal dropout occurs or the detected change of capacitance is weak, disrupted, or is otherwise not present. However, as will be explained below, the capacitive readings may be normalized or equalized such that the negative impact of the void spaces 430 may be reduced, minimized or eliminated.

Figure 5A:
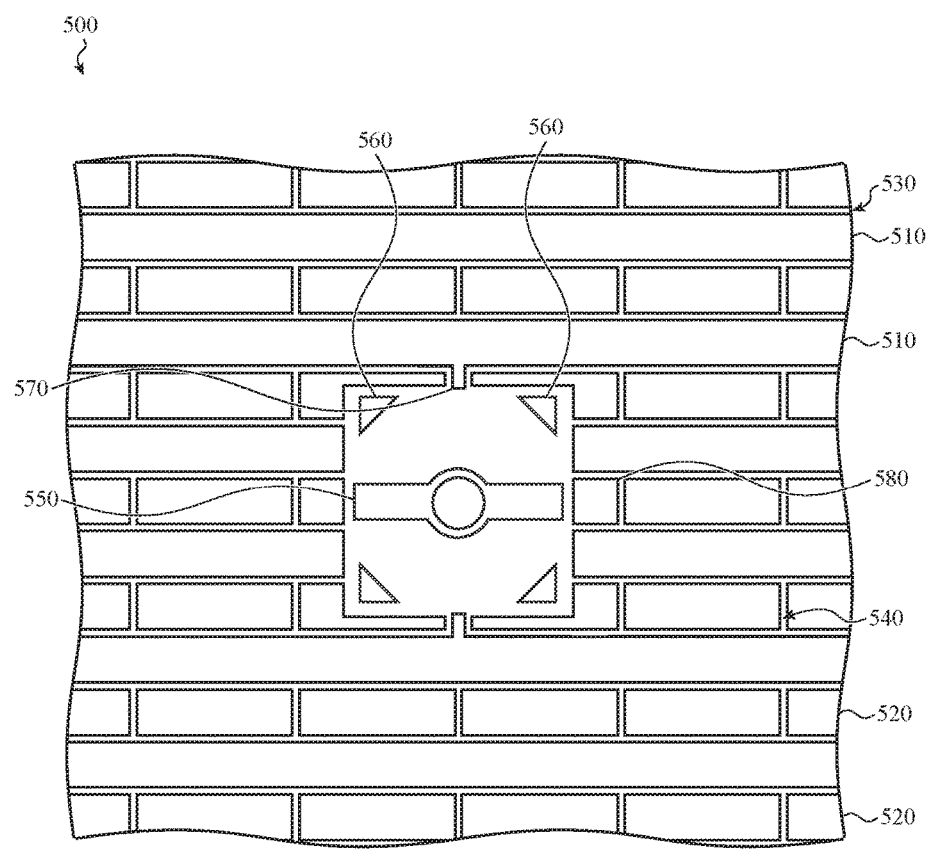
FIG. 5A illustrates a capacitive sensing layer that may be used in or incorporated by a multifunction input device.

FIG. 5A illustrates a capacitive sensing layer 500 of a printed circuit board or substrate that may be used or incorporated by a multifunction input device such as a keyboard. For example, the capacitive sensing layer 500 may be used in the stackups described above with respect to FIGS. 2A-3B. In some embodiments, the capacitive sensing layer 500 may be able to detect multiple areas of touch thereby enabling a user to provide various types of input to a computing device. This input may include, gestures, scroll commands, selection commands, swipe commands, and so on.

The capacitive sensing layer 500 includes one or more sense electrodes 510 and one or more drive electrodes 520. The sense electrodes 510 and the drive electrodes 520 are arranged around a periphery of a void space or a dead spot in which the one or more electrical contacts 550 and 560 are located. The sense electrodes 510 may be coupled in pairs and one or more drive electrodes may be positioned between each pair of the sense electrodes 510.

The drive electrodes 520 may be separated from the sense electrodes 510 by a gap or a space 530. The width of the space 530 may vary. Although not required, the space 530 may also contain one or more trace lines that provide a signal to a processing unit of the computing device or the keyboard. The trace lines may be provided below the drive electrodes 520 and/or below the sense electrodes 510. They may also be provided on the underside of a printed circuit board or other substrate associated with the capacitive sensing layer 500. Likewise, a space 540 or a gap may be provided between each of the drive electrodes 520. The width of the space 540 may vary and may also contain various trace lines such as described above. This pattern may be repeated throughout the capacitive sensing layer 500.

As discussed above, the capacitive sensing layer 500 may include or otherwise define a void space or other region in which the electrical contacts 550 and 560 are located. The electrical contacts 550 and 560 may provide a signal to a processing unit that a key has been actuated. For example, a dome mechanism, such as dome mechanism 250 or 350, or other component of the key may contact electrical contact 550 and electrical contact 560 and cause a signal to be provided to the processing unit to indicate a key was actuated.

However, and as described above, the electrical contacts 550 and 560 may cause a dead spot to be formed on the capacitive sensing layer 500 and cause a variance in the detected change in capacitance.

In order to reduce the variance, a protrusion 570 may extend into the void space. More specifically and as shown in FIG. 5A, the protrusion 570 may be part of a sense electrode 510 and may extend, at least partially, into the void space associated with the electrical contact 550 and/or electrical contact 560. However, in some embodiments, the protrusions 570 do not overlap the electrical contact 550 or the electrical contact 560.

The protrusion 570 creates a fringing field in the dead spot, which subsequently increases the sense capabilities of the capacitive sensing layer 500 in that region. For example, the fringing field may extend into the dead spot and be used to detect a change in capacitance. In some embodiments, the protrusion 570, the drive electrodes 520 and the sense electrodes 510 may be included on a single layer. In another embodiment, each of these components may be included on separate layers of the printed circuit board.

As shown in FIG. 5A, the electrical contact 550 may also cause partial electrodes 580 to be present on the capacitive sensing layer 500. In one embodiment, the partial electrodes 580 may be spaced evenly around the dead spot in a horizontal (or a vertical) orientation. In another embodiment, the partial electrodes 580 may not be spaced evenly around the dead spot caused by the electrical contacts 550 and 560. However, as positional accuracy of a received touch may be determined by the lowest quality electrode in the area, spreading the dead spot evenly among four adjacent electrodes may result in a higher minimum signal which results in better quality touch detection.

Figure 5B:
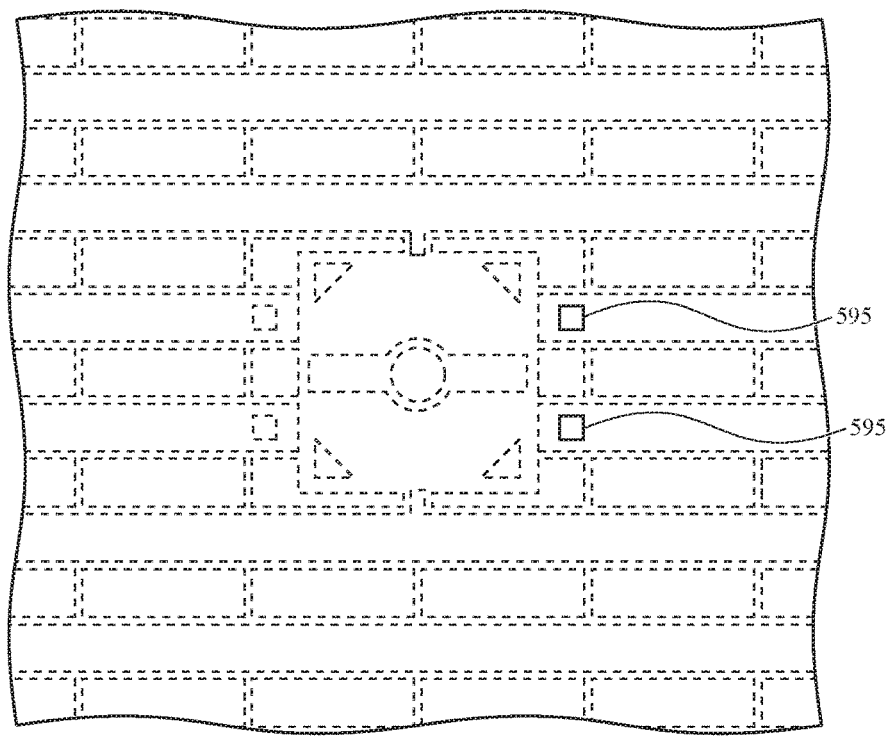
FIG. 5B illustrates a second layer of the capacitive sensing layer of FIG. 5A that may be used or incorporated by a multifunction input device.

FIG. 5B illustrates an additional layer 590 of a printed circuit board that may be positioned below or under the capacitive sensing layer 500 of FIG. 5A. In other implementations, the additional layer 590 may be positioned on or over the capacitive sensing layer 500. The additional layer 590 may include one or more tabs 595 that are located above one or more partial electrodes 580 (FIG. 5A). The tabs 595 may balance a baseline mutual capacitance of the capacitive sensing layer 500, thereby increasing the signal provided by the capacitive sensing layer 500.

Turning back to FIG. 5A and as briefly discussed above, the sense electrodes 510 and the drive electrodes 520 may be arranged in a particular pattern. In the embodiment shown in FIG. 5A, the drive electrodes 520 and the sense electrodes 510 are arranged in a two-split design. In this implementation, a row of sense electrode 510 splits a column of drive electrodes 520 twice in a given area.

Figure 6:
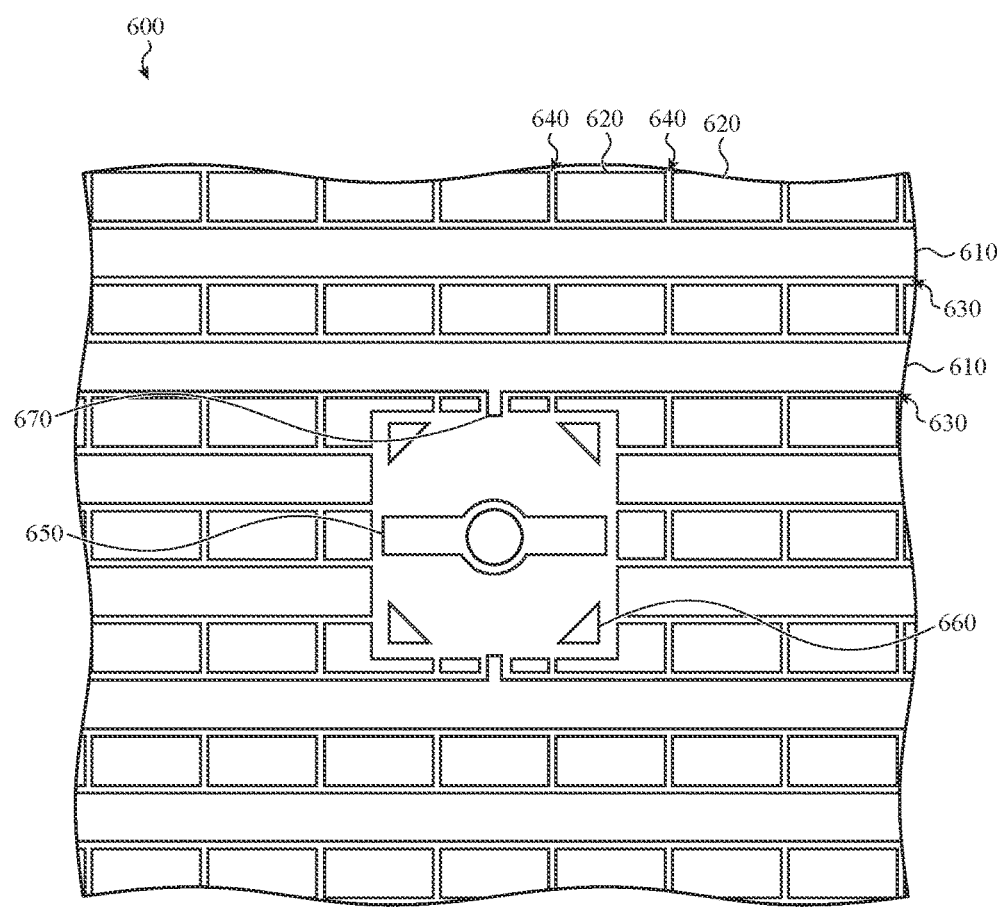
FIG. 6 illustrates an example arrangement of drive and sense electrodes of a capacitive sensing layer that may be used in or incorporated by a multifunction input device.

Although a specific example has been given, the dimensions of the sense electrodes 510 and the drive electrodes 520 may vary. For example and as shown in FIG. 6, a capacitive sensing layer 600 may have a three-split design. In this embodiment, the capacitive sensing layer 600 includes sense electrodes 610 separated by a space 630 or a gap, and drive electrodes 620 separated by a space 640 or a gap. The sense electrodes 610 and the drive electrodes surround a periphery of a void space in which an electrical contact 650 and electrical contacts 660 are located. Like the sense electrodes 510 of FIG. 5A, the sense electrode 610 may include a protrusion 670 that extends into the void space. The protrusion 670 functions in a similar manner as described above.

However, in this implementation, a row of sense electrodes 610 splits a column of drive electrodes 620 three times. In each of these embodiments, the dimensions of the various drive and sense electrodes may vary.

Figure 7:
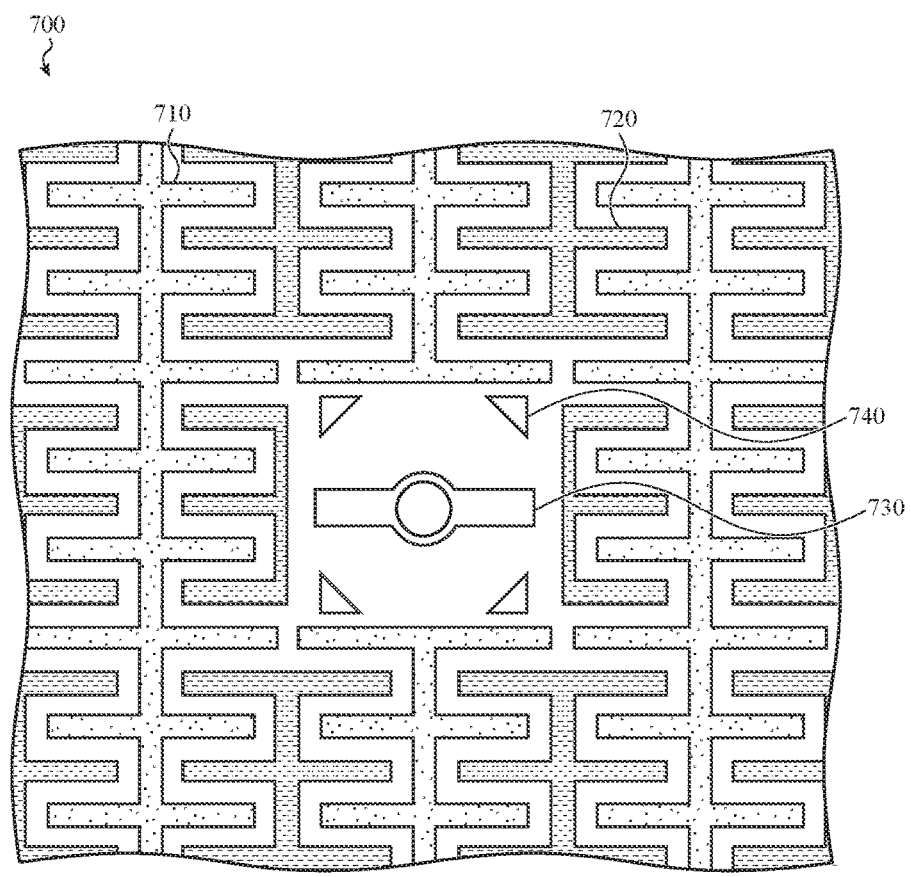
FIG. 7 illustrates another example arrangement of drive and sense electrodes of a capacitive sensing layer that may be used in or incorporated by a multifunction input device.

FIG. 7 illustrates another example arrangement of sense electrodes 710 and drive electrodes 720 of a capacitive sensing layer 700. In this embodiment, the sense electrodes 710 and the drive electrodes 720 form an interdigitated design in which the electrodes form an interleaving pattern. For example, portions or fingers of the drive electrodes 720 are interleaved with portions or fingers of the sense electrodes 710. This pattern may be repeated over the capacitive sensing layer 700.

In this implementation, the electrical contacts 730 and 740 may also be provided on the capacitive sensing layer 700 and function in a similar manner as described above. Although specific examples have been given, the drive electrodes 720 and the sense electrodes 710 may be arranged in a variety of patterns and arrangements.

Figure 8A:
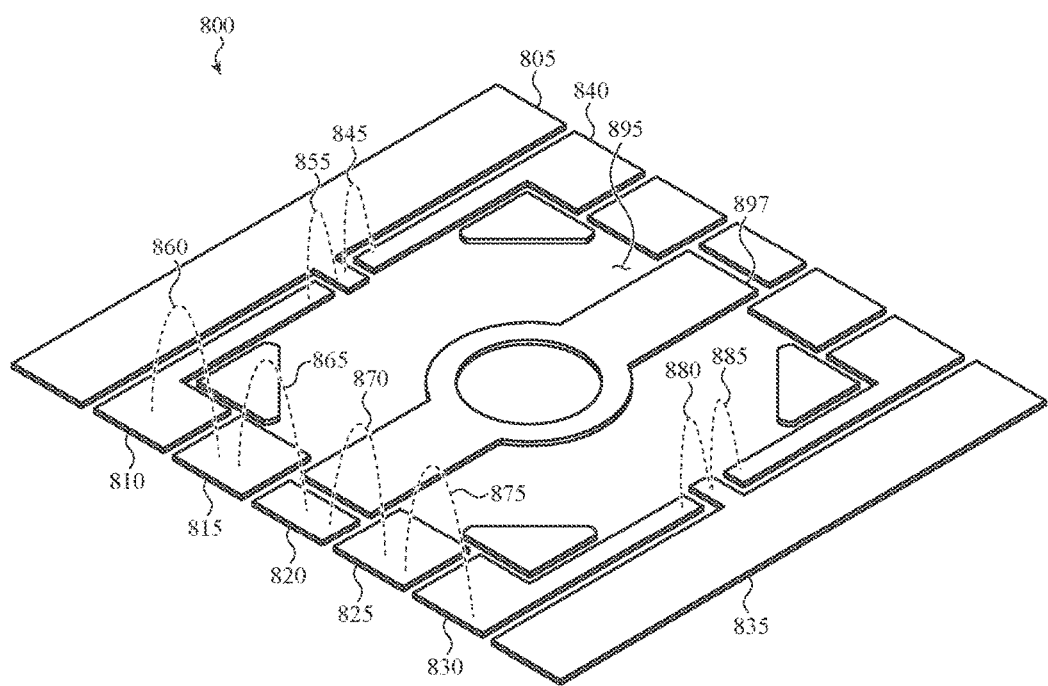
FIG. 8A illustrates field lines that represent a capacitance between various drive electrodes and sense electrodes of a capacitive sensing layer.

FIG. 8A illustrates field lines that represent a capacitance between various drive electrodes and sense electrodes of a capacitive sensing layer 800. In this example, the capacitive sensing layer 800 may be similar to the capacitive sensing layer 500 described above although similar effects may be seen using the capacitive sensing layer 600 and the capacitive sensing layer 700.

The capacitive sensing layer 800 may include a number of different drive and sense electrodes that surround a periphery of a void space 895 in which an electrical contact 897 is located. For example, the capacitive sensing layer 800 may have sense electrodes 805, 815, 825 and 835 and drive electrodes 810, 820, 830 and 840 surrounding an electrical contact 897. The sense electrodes 805, 815, 825 and 835 may be coupled in pairs and the drive electrodes 810, 820, 830 and 840 may be located between each pair of sense electrodes. For example, sense electrode 805 may be paired with sense electrode 815 and drive electrode 810 may be located between the pair.

When a charge or voltage is applied to a combination of electrodes (e.g., 810, 820, and 830) or a column of electrodes, a capacitance is produced between sense electrodes 805, 815, 825 and 835 and the drive electrodes 810, 820, and 830. The capacitance is represented by field lines 845, 855, 860, 865, 870, 875 and 880. For example, when a voltage is applied to drive electrode 810, an electric field may be generated bretween the drive electrode 810 and the sense electrodes 805 and 815. When a user's finger, or other input device, moves near the drive electrode 810 and/or the sense electrodes 805 and 815, the capacitance changes. The change in capacitance is detected by a processing unit associated with the capacitive sensing layer such as described above.

Figure 8B:
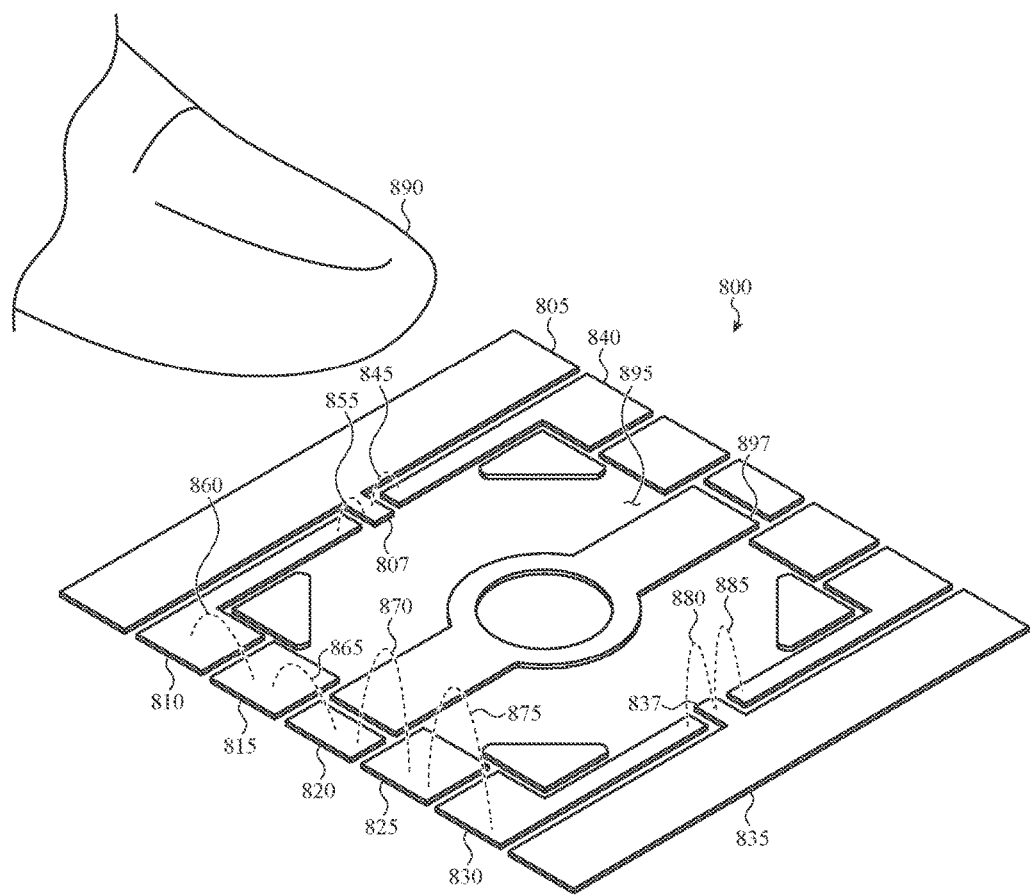
FIG. 8B illustrates how the capacitance may change when a user's finger or other input mechanism approaches the capacitive sensing layer of FIG. 8A.

For example and turning to FIG. 8B, when a user's finger 890, or other input mechanism, approaches drive electrodes 810 and 840 and sense electrodes 805 and 815, the capacitance (represented by field lines 845, 855, 860 and 865) changes. The change in capacitance indicates that an object is near the capacitive sensing layer 800 or has contacted a structure (e.g., a keycap or other input surface) associated with the capacitive sensing layer 800. As the user's finger 890 moves to other sections of the capacitive sensing layer 800, the capacitance between the various drive and sense electrodes changes in a similar manner.

In some implementations, the sense electrode 805 and sense electrode 835 may include protrusions 807 and 837 respectively that extend between different drive electrodes and into the void space 895. In some embodiments, the protrusions 807 and 837 do not overlap the electrical contact 897 included in the void space 895.

The protrusions 807 and 837 cause the electric field to extend into the void space 895 of the capacitive sensing layer 800. As a user's finger or other object approaches the void space 895, the strength of the fringing field may change. As a result, location of the user's finger may be detected such as previously described.

Figure 9:
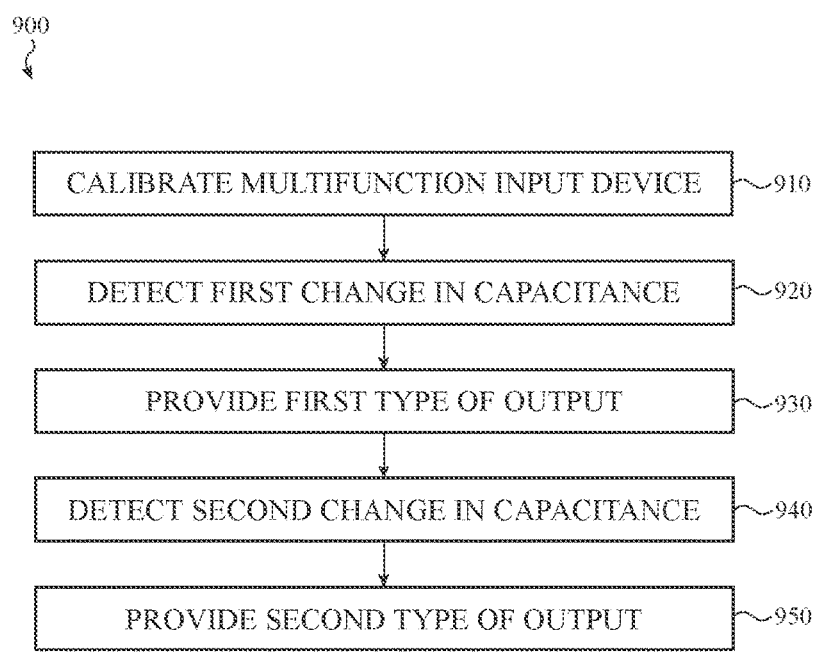
FIG. 9 illustrates a method for detecting input received by a multifunction input device.

FIG. 9 illustrates a method 900 for detecting input received by a multifunction input device and normalizing the received input. In some embodiments, the multifunction input device may be a keyboard such as described above.

Method 900 begins at operation 910 in which input received on the multifunction input device is normalized using, for example, a calibration process. More specifically, the calibration process normalizes a detected change in capacitance caused by an input mechanism, such as a user's finger, contacting a surface of the multifunction input device. The calibration process may be needed to account for dead spots or void spaces that may be present on the capacitive sensing layer due to key makes that may be present on a printed circuit board and/or due to interference caused by various components of a button stackup of the input device. The calibration process will be discussed in greater detail below with respect to FIG. 10.

In operation 920, a first change in capacitance is detected. In some embodiments, the first change in capacitance may be an actuation of button or key of the multifunction input device. For example, if the first change in capacitance exceeds a first threshold, a processing unit of the electronic device may determine that a particular key or button has been actuated. A corresponding output may then be provided 930 on a display of the electronic device. For example, the output may be a character, letter or symbol associated with the key or button that was actuated.

In some embodiments a contact associated with a key or button (e.g., contact 260 FIGS. 2A-2B) may be used to determine when the key or button has been actuated. In other embodiments, a capacitive sensor may be used, either alone or in combination with the contact, to determine whether a key has been actuated. For example, if the capacitive sensor detects a change in capacitance over a threshold, a key actuation event is detected. Likewise, if a portion of the key touches the contact, a key actuation event is also detected.

In operation 940, a second change in capacitance is detected. The second change in capacitance may be less than the first detected change in capacitance. The second change in capacitance may be the result of the user moving his finger (or some other object) over one or more surfaces (e.g., one or more keys, buttons, and/or the frame) of the multifunction input device.

In some embodiments, the detected change in capacitance may be associated with a particular vector. When the detected parameters of the vector exceed a threshold, the processing unit may determine that a particular touch input gesture has been received and provide output accordingly.

In response to the second change in capacitance, a second type of output is provided 950. The second type of output may be, for example, a scroll command, a swipe command, a cursor movement command, or a selection command (e.g., a command equivalent to a single click or a double click of a typical mouse or other input device). Accordingly, the multifunction input device may be able to distinguish between different types of received input.

Figure 10:
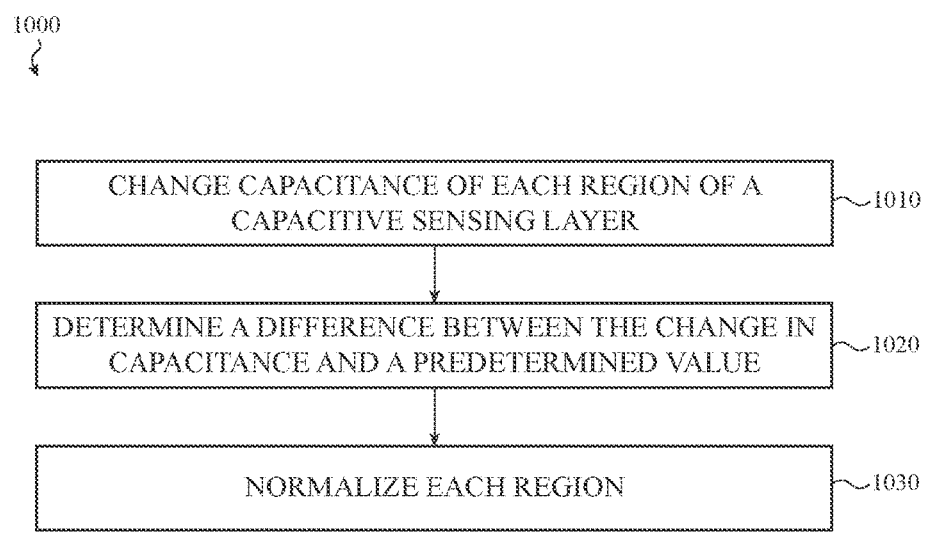
FIG. 10 illustrates a method for calibrating a multifunction input device.

FIG. 10 illustrates a method 1000 for normalizing a change in capacitance of a multifunction input device using a calibration technique. As discussed above, a surface of a multifunction input device may include various surface discontinuities. The discontinuities may be caused by the profile of a keycap and/or the difference in height between the keycap and a frame surrounding the keycap. As such, a touch profile detected by the capacitive sensing layer may be distorted based on the location of the contact. For example, since the keycap may be associated with a void space that does not include a portion of the capacitive sensing layer, a change in capacitance might not be readily detected when a user touches an input surface of the keycap. In contrast, a portion of the capacitive sensing layer may be directly located underneath the frame surrounding the keycap. As such, any change in capacitance when a user touches the frame (or a portion of the keycap near the frame) may be readily detected.

However, the calibration method 1000 described below may be used to normalize a change in capacitance that is detected by a capacitive sensing layer associated or otherwise integrated with a multifunction input device such as a keyboard.

Calibration method 1000 begins at operation 1010 in which a change in capacitance for each region of the capacitive sensing layer is effected. In some embodiments, touch input is provided at a first location and at a second location that is different from the first location. For example, an input mechanism, such as a user's finger, a stylus, or other input mechanism, is moved over the entire surface of the multifunction input device. In response to the received input, each drive electrode and sense electrode of the capacitive sensing layer register a detected change in capacitance.

Once this process is complete, flow proceeds to operation 1020 and a difference between the detected change in capacitance and a predetermined value is determined. More specifically, for each drive and sense electrode in the capacitive sensing layer, a maximum value over the period of time that the change is capacitance is detected is recorded. In some embodiments, each electrode may be required to have a maximum value (e.g., the highest detected change in capacitance when compared to neighboring electrodes) at least once.

Flow then proceeds to operation 1030 in which each region of the capacitive sensing layer is normalized. For example, for each electrode in the capacitive sensing layer, a gain is determined such that when the gain is applied, the detected change in capacitance is equivalent to the predetermined value. The determination of the gain is represented by the following equation:

$$\text{Gain}_i = X / \text{Max } V_i$$

In the equation above, the predetermined value (represented by "X") is a digital representation of a capacitive signal determined by the electrodes in the capacitive sensing layer. Max $V_i$ is the maximum value of the given electrode over the given period of time discussed above.

Using calibration method 1000, the detected change is capacitance may be the same or substantially the same regardless of whether the input mechanism is over the frame or over the keycap.

Figure 11:
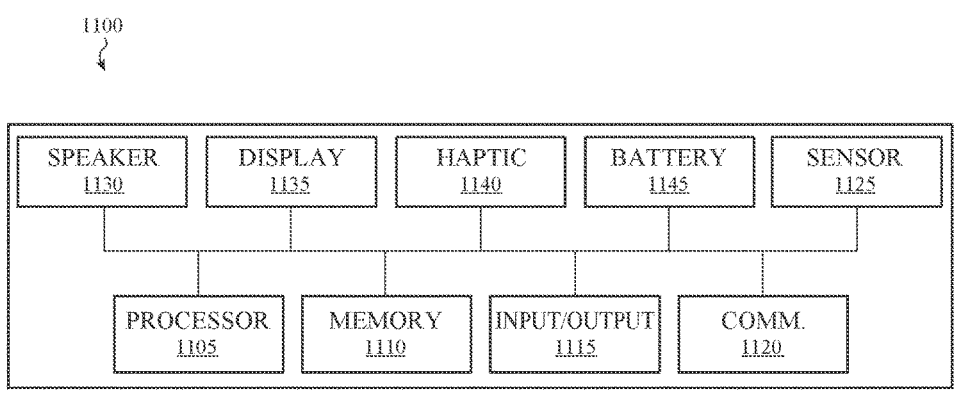
FIG. 11 illustrates example components of a computing device.

FIG. 11 illustrates example components of a computing device 1100 that may use a capacitive sensing layer such as described herein. As such, the computing device 1100 may also utilize the methods described herein to normalize the capacitive readings of the capacitive sensing layer.

As shown in FIG. 11, the computing device 1100 includes at least one processor 1105 or processing unit configured to access a memory 1110. The memory 1110 may have various instructions, computer programs, or other data stored thereon. The instructions may be configured to perform one or more of the operations or functions described with respect to the computing device 1100. For example, the instructions may be configured to control or coordinate the operation of the display 1135, one or more input/output components 1115, one or more communication channels 1120, one or more sensors 1125, a speaker 1130, and/or one or more haptic actuators 1140. In some embodiments, the memory 1110 includes the threshold determinations for the different types of received input such as described above.

The processor 1105 may be implemented as any computing device capable of processing, receiving, or transmitting data or instructions. For example, the processor 1105 can be a microprocessor, a central processing unit (CPU), an application-specific integrated circuit (ASIC), a digital signal processor (DSP), or combinations of such devices.

The memory 1110 can store electronic data that can be used by the computing device 1100. For example, the memory 1110 can store electrical data or content such as, for example, audio and video files, documents and applications, device settings and user preferences, timing and control signals or data for the various modules, data structures or databases, and so on.

The memory 1110 may be any type of memory such as, for example, random access memory, read-only memory, Flash memory, removable memory, or other types of storage elements, or combinations of such devices.

The computing device 1100 may include various input and output components represented in FIG. 11 as Input/Output 1115. Although the input and output components are represented as a single item, the computing device 1100 may include a number of different input components, including buttons, input surfaces, microphones, switches, rotatable crowns, dials and other input mechanisms for accepting user input. The input and output components may include one or more touch sensors and/or force sensors. For example, the display 1135 may be comprised of a display stack that includes one or more touch sensors and/or one or more force sensors that enable a user to provide input to the computing device 1100.

The computing device 1100 may also include one or more communication channels 1120. These communication channels 1120 may include one or more wireless interfaces that provide communications between the processor 1105 and an external device or other computing device. In general, the one or more communication channels 1120 may be configured to transmit and receive data and/or signals that may be interpreted by instructions executed on the processor 1105. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

The computing device 1100 may also include one or more sensors 1125. Although a single representation of a sensor 1125 is shown in FIG. 11, the computing device 1100 may have many sensors. These sensors may include resistive sensors, light sensors, capacitive sensors, biometric sensors, temperature sensors, accelerometers, gyroscopes, barometric sensors, moisture sensors, and so on.

One or more acoustic modules or speakers 1130 may also be included in the computing device 1100. The speaker 1130 may be configured to produce an audible sound or an acoustic signal.

As also shown in FIG. 11, the computing device 1100 may include a haptic actuator 1140. The haptic actuator 1140 may be any type of haptic actuator that provides haptic output such as, for example, any type of rotational haptic device, linear haptic actuator, piezoelectric devices, vibration elements, and so on. The haptic actuator 1140 is configured to provide haptic output in response to received input. For example, the haptic actuator 1140 may provide haptic output in response to the change in capacitance detected by the capacitive sensing layer described herein.

The computing device 1100 may also include an internal battery 1145. The internal battery 1145 may be used to store and provide power to the various components and modules of the computing device 1100 including the haptic actuator 1140. The battery 1145 may be configured to be charged using a wireless charging system although a wired charging system may also be used.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A keyboard, comprising:
   an array of keys, each key of the array of keys comprising:
      a keycap;
      an actuation mechanism coupled to the keycap and configured to move the keycap between an unactuated and an actuated position; and
      a switch disposed beneath the keycap and comprising a dome that is configured to contact an electrical contact when the keycap is in the actuated position;
   a frame defining an array of openings, each key of the array of keys positioned in a respective opening; and
   a capacitive sensing layer disposed below the frame and the array of keys, the capacitive sensing layer configured to detect a touch input across multiple keys of the array of keys and one or more portions of the frame, wherein for each key of the array of keys:
      the capacitive sensing layer defines a void space beneath the keycap in which the electrical contact is positioned; and
      at least one sense electrode and at least one drive electrode of the capacitive sensing layer are arranged around a periphery of the void space.

2. The keyboard of claim 1, wherein the capacitive sensing layer is calibrated to normalize a detected change in capacitance over the keycap and at least a portion of the frame.

3. The keyboard of claim 1, wherein the at least one sense electrode comprises a protrusion extending into the void space.

4. The keyboard of claim 1, further comprising a fabric layer positioned over the keycap.

5. The keyboard of claim 4, wherein the fabric layer comprises an embossed portion that extends beyond a surface area of the keycap and operative to provide a smooth transition between the frame and the surface area of the keycap.

6. The keyboard of claim 4, wherein the fabric layer defines recesses between respective keys of the array of keys.

7. The keyboard of claim 1, wherein a portion of the at least one sense electrode is interleaved with a corresponding portion of the at least one drive electrode.

8. The keyboard of claim 1, further comprising a substrate, wherein the capacitive sensing layer is embedded in the substrate.

9. An input device, comprising:
   a frame defining first and second openings and a frame segment positioned between and at least partially defining the first and second openings;
   a first key positioned in the first opening and defining a first input surface;
   a second key positioned in the second opening and defining a second input surface, each of the first and second keys comprising:
      a keycap configured to actuate in response to a key input; and
      an electrical contact positioned beneath the keycap and configured to provide a signal in response to an actuation of the keycap; and
   a capacitive sensing layer positioned below the frame and configured to detect a touch input along the first input surface, the second input surface, and at least a portion of the frame segment.

10. The input device of claim 9, wherein the capacitive sensing layer is calibrated such that a detected change in capacitance is normalized over the first input surface and the second input surface.

11. The input device of claim 9, wherein a portion of the capacitive sensing layer is coupled to the frame of the input device.

12. The input device of claim 9, wherein the capacitive sensing layer is operative to distinguish a first type of input from a second type of input received along the first input surface, the second input surface, and the at least the portion of the frame segment.

13. The input device of claim 9, further comprising a fabric layer disposed over the keycap.

14. A method for detecting a touch input received across multiple keys and a portion of a frame of a touch-sensitive keyboard, comprising:

in response to receiving a first portion of the touch input along a first key of the touch-sensitive keyboard, detecting a first change in capacitance in a first region of a capacitive sensing layer located beneath the first key, the first key comprising an electrical contact positioned in the first region and configured to provide a signal indicating actuation of the first key;

in response to receiving a second portion of the touch input along a frame segment of the touch-sensitive keyboard, detecting a second change in capacitance in a second region of the capacitive sensing layer located beneath the frame segment, wherein the first region is different from the second region;

in response to receiving a third portion of the touch input along a second key of the touch-sensitive keyboard, detecting a third change in capacitance in a third region of the capacitive sensing layer located beneath the second key of the touch-sensitive keyboard; and adjusting an output signal of the capacitive sensing layer to normalize the first change in capacitance with respect to at least one of the second change in capacitance or the third change in capacitance.

* * * * *